United States Patent
Yuan et al.

(10) Patent No.: US 12,388,514 B2
(45) Date of Patent: Aug. 12, 2025

(54) QUASI-COLLOCATION (QCL) ASSUMPTION OF SIMULTANEOUS PHYSICAL UPLINK CONTROL CHANNEL (PUCCH) AND PHYSICAL UPLINK SHARED CHANNEL (PUSCH)

(71) Applicant: QUALCOMM INCORPORATED, San Diego, CA (US)

(72) Inventors: Fang Yuan, Beijing (CN); Wooseok Nam, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 18/000,274

(22) PCT Filed: Jul. 30, 2020

(86) PCT No.: PCT/CN2020/105718
§ 371 (c)(1),
(2) Date: Nov. 29, 2022

(87) PCT Pub. No.: WO2022/021189
PCT Pub. Date: Feb. 3, 2022

(65) Prior Publication Data
US 2023/0308160 A1    Sep. 28, 2023

(51) Int. Cl.
| | | |
|---|---|---|
| *H04B 7/06* | (2006.01) | |
| *H04W 72/20* | (2023.01) | |
| *H04W 72/56* | (2023.01) | |

(52) U.S. Cl.
CPC ........ *H04B 7/06968* (2023.05); *H04W 72/20* (2023.01); *H04W 72/56* (2023.01)

(58) Field of Classification Search
CPC ... H04B 7/06968; H04W 72/56; H04W 72/20
See application file for complete search history.

(56) References Cited

U.S. PATENT DOCUMENTS

| 2019/0246432 A1 | 8/2019 | Hosseini et al. |
| 2019/0364561 A1 | 11/2019 | Xiong et al. |
| (Continued) | | |

FOREIGN PATENT DOCUMENTS

| CN | 110859008 A | 3/2020 |
| WO | WO-2020072893 A1 | 4/2020 |

OTHER PUBLICATIONS

Apple Inc: "Remaining Issues on Multi-beam Operation", 3GPP TSG-RAN WG1 Meeting #98bis, R1-1910969, Chongqing, China, Oct. 14-20, 2019, 14 Pages, Whole document.

(Continued)

*Primary Examiner* — Won Tae C Kim
(74) *Attorney, Agent, or Firm* — Arun Swain

(57) ABSTRACT

This disclosure provides systems, methods and apparatus, including computer programs encoded on computer storage media, for wireless communications. In one aspect, a user equipment (UE) may receive, from a base station, a configuration message indicating a first beam associated with an uplink control transmission and downlink control information (DCI) indicating a second beam associated with the uplink data transmission. The UE may select the first beam or the second beam based on an overlap in time between the uplink control transmission and the uplink data transmission. The base station may identify the first beam or the second beam based on the overlap between the uplink control transmission and the uplink data transmission. The UE may transmit, and a base station may receive, at least a (Continued)

portion of the uplink control transmission and at least a portion of the uplink data transmission using the selected first beam or second beam.

22 Claims, 17 Drawing Sheets

(56) References Cited

U.S. PATENT DOCUMENTS

| | | | |
|---|---|---|---|
| 2020/0205088 A1 | 6/2020 | Yang et al. | |
| 2021/0329624 A1* | 10/2021 | Huang | H04L 5/0051 |
| 2021/0409097 A1* | 12/2021 | Zhang | H04B 7/088 |
| 2021/0410165 A1* | 12/2021 | Xiong | H04L 5/001 |

OTHER PUBLICATIONS

International Search Report and Written Opinion—PCT/CN2020/105718—ISA/EPO—Apr. 25, 2021.
LG Electronics: Feature lead summary of Enhancements on Multi-beam Operations, 3GPP TSG RAN WG1 Ad-Hoc Meeting 1901, R1-1901429, 3rd Generation Partnership Project, Mobile Competence Centre 650, Route Des Lucioles, F-06921 Sophia, vol. RAN WG1, No. Taipei, Taiwan, Jan. 21, 2019-Jan. 25, 2019, Jan. 24, 2019, 32 Pages, XP051601341.
Supplementary European Search Report—EP20947054—Search Authority—Munich—Mar. 20, 2024.

\* cited by examiner

QUASI-COLLOCATION (QCL) ASSUMPTION OF SIMULTANEOUS PHYSICAL UPLINK CONTROL CHANNEL (PUCCH) AND PHYSICAL UPLINK SHARED CHANNEL (PUSCH)

CROSS REFERENCE

The present application is a 371 national stage filing of International PCT Application No. PCT/CN2020/105718 by YUAN et al. entitled "QUASI-COLLOCATION (QCL) ASSUMPTION OF SIMULTANEOUS PHYSICAL UPLINK CONTROL CHANNEL (PUCCH) AND PHYSICAL UPLINK SHARED CHANNEL (PUSCH)," filed Jul. 30, 2020, which is assigned to the assignee hereof, and which is expressly incorporated by reference in its entirety herein.

TECHNICAL FIELD

The following relates to wireless communications, including quasi-collocation (QCL) assumption of simultaneous physical uplink control channel (PUCCH) and physical uplink shared channel (PUSCH).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless multiple-access communications systems, a UE may receive a semi-static configuration of one beam to use for uplink control transmissions (such as, physical uplink control channel (PUCCH) transmissions). In some implementations, the UE may receive a dynamic grant of a different beam to use for uplink data transmissions (such as, physical uplink shared channel (PUSCH) transmissions). The UE may transmit uplink control transmissions and uplink data transmissions over antenna panels of the UE using the different beams.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE) is described. In some implementations, the method can include receiving a configuration message indicating a first beam associated with an uplink control transmission, receiving downlink control information (DCI) including a grant for an uplink data transmission, the DCI indicating a second beam associated with the uplink data transmission, selecting the first beam or the second beam for transmitting both the uplink control transmission and the uplink data transmission based on an overlap in time between the uplink control transmission and the uplink data transmission, and transmitting at least a portion of the uplink control transmission and at least a portion of the uplink data transmission using the selected first beam or second beam.

Another innovative aspect of the subject matter described in this disclosure can be implemented in an apparatus for wireless communication at an apparatus of a UE is described. The apparatus can include a first interface, a second interface, and a processing system. The first interface may be configured to obtain a configuration message indicating a first beam associated with an uplink control transmission and obtain DCI including a grant for an uplink data transmission, the DCI indicating a second beam associated with the uplink data transmission. The processing system may be configured to select the first beam or the second beam for transmitting both the uplink control transmission and the uplink data transmission based on an overlap in time between the uplink control transmission and the uplink data transmission. The second interface may be configured to output at least a portion of the uplink control transmission and at least a portion of the uplink data transmission for transmission using the selected first beam or second beam.

Another innovative aspect of the subject matter described in this disclosure can be implemented in another apparatus for wireless communication at an apparatus of a UE is described. The apparatus can include means for receiving a configuration message indicating a first beam associated with an uplink control transmission, receiving DCI including a grant for an uplink data transmission, the DCI indicating a second beam associated with the uplink data transmission, selecting the first beam or the second beam for transmitting both the uplink control transmission and the uplink data transmission based on an overlap in time between the uplink control transmission and the uplink data transmission, and transmitting at least a portion of the uplink control transmission and at least a portion of the uplink data transmission using the selected first beam or second beam.

Another innovative aspect of the subject matter described in this disclosure can be implemented in a non-transitory computer-readable medium storing code for wireless communication at an apparatus of a UE is described. The code can include instructions executable by a processor to receive a configuration message indicating a first beam associated with an uplink control transmission, receive DCI including a grant for an uplink data transmission, the DCI indicating a second beam associated with the uplink data transmission, select the first beam or the second beam for transmitting both the uplink control transmission and the uplink data transmission based on an overlap in time between the uplink control transmission and the uplink data transmission, and transmit at least a portion of the uplink control transmission and at least a portion of the uplink data transmission using the selected first beam or second beam.

In some implementations, the method, apparatuses, and non-transitory computer-readable medium can include operations, features, means, or instructions for selecting the first beam or the second beam for transmitting both the uplink control transmission and the uplink data transmission can be based on a first priority associated with the first beam and a second priority associated with the second beam.

In some implementations, the method, apparatuses, and non-transitory computer-readable medium can include operations, features, means, or instructions for determining that the first priority associated with the first beam can be greater than the second priority associated with the second beam based on an association between the first beam and the uplink control transmission, and where the selecting can include selecting the first beam for transmitting both the uplink control transmission and the uplink data transmission based on the determining, and where the transmitting can include transmitting at least the portion of the uplink control transmission and at least the portion of the uplink data transmission using the selected first beam.

In some implementations, the method, apparatuses, and non-transitory computer-readable medium can include operations, features, means, or instructions for determining that the first priority associated with the first beam can be greater than the second priority associated with the second beam based on an association between the first beam and the uplink control transmission, where the selecting can include selecting the second beam for transmitting both the uplink control transmission and the uplink data transmission based on the determining, and where the transmitting can include transmitting at least the portion of the uplink control transmission and at least the portion of the uplink data transmission using the selected second beam.

In some implementations, the method, apparatuses, and non-transitory computer-readable medium can include operations, features, means, or instructions for receiving an indication of the first priority associated with the first beam and an indication of the second priority associated with the second beam, where the selecting the first beam or the second beam can be based on a difference between the first priority associated with the first beam and the second priority associated with the second beam.

In some implementations of the method, apparatuses, and non-transitory computer-readable medium described herein, the first priority associated with the first beam and the second priority associated with the second beam can include physical layer priorities.

In some implementations, the method, apparatuses, and non-transitory computer-readable medium can include operations, features, means, or instructions for determining, based on receiving the configuration message and the DCI, that the second beam associated with the uplink data transmission can be the same as the first beam associated with the uplink control transmission, where transmitting at least the portion of the uplink control transmission and at least the portion of the uplink data transmission can be based on the determination.

In some implementations of the method, apparatuses, and non-transitory computer-readable medium described herein, the transmitting can include operations, features, means, or instructions for transmitting at least the portion of the uplink control transmission and at least the portion of the uplink data transmission over a single antenna panel of the UE.

In some implementations of the method, apparatuses, and non-transitory computer-readable medium described herein, the uplink control transmission can include a physical uplink control channel (PUCCH) transmission.

In some implementations of the method, apparatuses, and non-transitory computer-readable medium described herein, the uplink data transmission can include a physical uplink shared channel (PUSCH) transmission.

Another innovative aspect of the subject matter described in this disclosure can be implemented in a method of wireless communication at an apparatus of a base station is described. In some implementations, the method can include transmitting a configuration message indicating a first beam associated with an uplink control transmission, transmitting DCI including a grant for an uplink data transmission, the DCI specifying a second beam associated with the uplink data transmission, identifying the first beam or the second beam for a UE transmission of both the uplink control transmission and the uplink data transmission to the base station based on an overlap in time between the uplink control transmission and the uplink data transmission, and receiving at least a portion of the uplink control transmission and at least a portion of the uplink data transmission via the selected first beam or second beam.

Another innovative aspect of the subject matter described in this disclosure can be implemented in an apparatus for wireless communication at an apparatus of a base station is described. The apparatus can include a first interface, a second interface, and a processing system. The first interface may be configured to output a configuration message indicating a first beam associated with an uplink control transmission and output DCI including a grant for an uplink data transmission, the DCI specifying a second beam associated with the uplink data transmission. The processing system may be configured to identify the first beam or the second beam for a UE transmission of both the uplink control transmission and the uplink data transmission to the base station based on an overlap in time between the uplink control transmission and the uplink data transmission. The second interface may be configured to obtain at least a portion of the uplink control transmission and at least a portion of the uplink data transmission for transmission via the selected first beam or second beam.

Another innovative aspect of the subject matter described in this disclosure can be implemented in an apparatus for wireless communication at an apparatus of a base station is described. The apparatus can include means for transmitting a configuration message indicating a first beam associated with an uplink control transmission, transmitting DCI including a grant for an uplink data transmission, the DCI specifying a second beam associated with the uplink data transmission, identifying the first beam or the second beam for a UE transmission of both the uplink control transmission and the uplink data transmission to the base station based on an overlap in time between the uplink control transmission and the uplink data transmission, and receiving at least a portion of the uplink control transmission and at least a portion of the uplink data transmission via the selected first beam or second beam.

Another innovative aspect of the subject matter described in this disclosure can be implemented in a non-transitory computer-readable medium storing code for wireless communication at an apparatus of a base station is described. The code can include instructions executable by a processor to transmit a configuration message indicating a first beam associated with an uplink control transmission, transmit DCI including a grant for an uplink data transmission, the DCI specifying a second beam associated with the uplink data transmission, identify the first beam or the second beam for a UE transmission of both the uplink control transmission and the uplink data transmission to the base station based on an overlap in time between the uplink control transmission and the uplink data transmission, and receive at least a portion of the uplink control transmission and at least a portion of the uplink data transmission via the selected first beam or second beam.

In some implementations, the method, apparatuses, and non-transitory computer-readable medium can include operations, features, means, or instructions for identifying the first beam or the second beam for the UE transmission of both the uplink control transmission and the uplink data transmission to the base station can be based on a first priority associated with the first beam and a second priority associated with the second beam.

In some implementations, the method, apparatuses, and non-transitory computer-readable medium can include operations, features, means, or instructions for determining that the first priority associated with the first beam can be greater than the second priority associated with the second beam based on an association between the first beam and the uplink control transmission, and where the identifying can include identifying the first beam for the UE transmission of both the uplink control transmission and the uplink data transmission based on the determining, and where the receiving can include receiving at least the portion of the uplink control transmission and at least the portion of the uplink data transmission via the identified first beam.

In some implementations, the method, apparatuses, and non-transitory computer-readable medium can include operations, features, means, or instructions for determining that the first priority associated with the first beam can be greater than the second priority associated with the second beam based on an association between the first beam and the uplink control transmission, where the identifying can include identifying the second beam for the UE transmission of both the uplink control transmission and the uplink data transmission based on the determining, and where the receiving can include receiving at least the portion of the uplink control transmission and at least the portion of the uplink data transmission via the identified second beam.

In some implementations, the method, apparatuses, and non-transitory computer-readable medium can include operations, features, means, or instructions for transmitting an indication of the first priority associated with the first beam and an indication of the second priority associated with the second beam, where the identifying the first beam or the second beam can be based on a difference between the first priority associated with the first beam and the second priority associated with the second beam.

In some implementations of the method, apparatuses, and non-transitory computer-readable medium described herein, the first priority associated with the first beam and the second priority associated with the second beam can include physical layer priorities.

In some implementations, the method, apparatuses, and non-transitory computer-readable medium can include operations, features, means, or instructions for identifying that the second beam associated with the uplink data transmission can be the same as the first beam associated with the uplink control transmission, where receiving at least the portion of the uplink control transmission and at least the portion of the uplink data transmission can be based on the identification.

In some implementations of the method, apparatuses, and non-transitory computer-readable medium described herein, the receiving can include operations, features, means, or instructions for receiving at least the portion of the uplink control transmission and at least the portion of the uplink data transmission over a single antenna panel of the base station.

In some implementations of the method, apparatuses, and non-transitory computer-readable medium described herein, the uplink control transmission can include a PUCCH transmission.

In some implementations of the method, apparatuses, and non-transitory computer-readable medium described herein, the uplink data transmission can include a PUSCH transmission.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
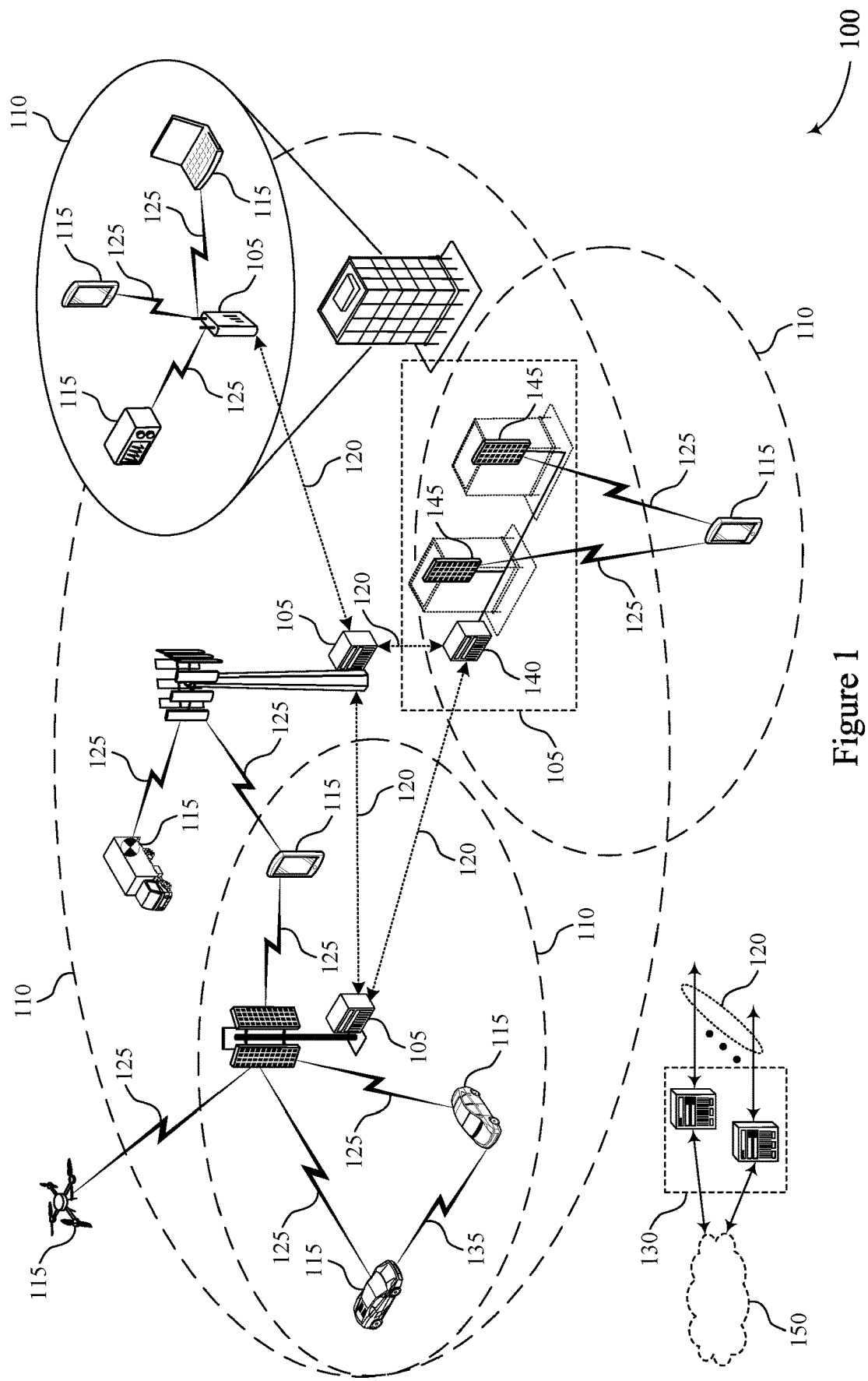
FIG. 1 shows a schematic diagram of an example system for wireless communications that supports quasi-collocation (QCL) assumption of simultaneous physical uplink control channel (PUCCH) and physical uplink shared channel (PUSCH).

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Aspects of the disclosure are described in the context of wireless communications systems. Generally, the described techniques provide various mechanisms that support simultaneously transmitting uplink control transmissions and uplink data transmissions which at least partially overlap in time. In single panel uplink transmissions, a user equipment (UE) may select a single beam over which to transmit the uplink control transmissions and the uplink data transmissions.

A UE may receive a configuration message indicating a first beam associated with an uplink control transmission (such as, a physical uplink control channel (PUCCH transmission). The UE may receive downlink control information (DCI) including a grant for an uplink data transmission (such as, a physical uplink shared channel (PUSCH) transmission), the DCI indicating a second beam associated with the uplink data transmission. In an aspect, the UE may select the first beam or the second beam for transmitting both the uplink control transmission and the uplink data transmission based on an overlap in time between the uplink control transmission and the uplink data transmission. In some aspects, the UE may select the first beam or the second beam based on a set of rules or criteria. In an example, the UE may select between the first beam and the second beam based on a first priority associated with the first beam and a second priority associated with the second beam. The priorities associated with the beams may include physical layer (PHY) priorities. The UE may transmit at least a portion of the uplink control transmission and at least a portion of the uplink data transmission using the selected first beam or second beam.

Particular implementations of the subject matter described in this disclosure can be implemented to realize one or more of the following potential advantages. In some aspects, transmitting both an uplink control transmission (such as, PUCCH transmission) and an uplink data transmission (such as, PUSCH transmission) over the same beam for cases in which the uplink control transmission and the uplink data transmission overlap in time may increase spectrum utilization and spectral efficiency. For example, the implementations described herein may advantageously utilize resources through dynamic horizontal (such as, across the time domain) sharing of the resources. In an example, the implementations may advantageously transmit at least a portion of the uplink control transmission (such as, transmit hybrid automatic repeat request (HARQ) feedback, a scheduling request (SR), or channel state information (CSI) reporting information) and at least a portion of the uplink data transmission over the same beam for cases of overlap in the time domain, rather than refrain from transmitting the uplink control transmission. In some aspects, selecting between a beam associated with the uplink control transmission (such as, PUCCH transmission) and a beam associated with the uplink data transmission (such as, PUSCH transmission) may provide design flexibility. For example, the beam associated with the uplink control transmission (such as, PUCCH transmission) may be a relatively wider beam having higher reliability and connectivity, and the beam associated with the uplink data transmission (such as, PUSCH transmission) may be a relatively narrower beam providing a higher bandwidth and increased throughput. Selecting between the different beams may provide design flexibility with respect to reliability, connectivity, bandwidth, and throughput.

FIG. 1 shows a schematic diagram 100 of an example system for wireless communications that supports quasi-collocation (QCL) assumption of simultaneous PUCCH and PUSCH. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (such as, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (such as, via an S1, N2, N3, or another interface). The base stations 105 may communicate with one another over the backhaul links 120 (such as, via an X2, Xn, or other interface) either directly (such as, directly between base stations 105), or indirectly (such as, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among some other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among some other examples, which may be implemented in various objects such as appliances, or vehicles, meters, among some other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among some other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as, a bandwidth part (BWP)) that is operated according to one or more physical layer channels for a given radio access technology (such as, LTE, LTE-A, LTE-A Pro, NR). Each physical layer channel may carry acquisition signaling (such as, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

In some examples (such as, in a carrier aggregation configuration), a carrier also may have acquisition signaling or control signaling that coordinates operations for other carriers. A carrier may be associated with a frequency channel (such as, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (such as, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (such as, in an FDD mode) or may be configured to carry downlink and uplink communications (such as, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as, 1.4, 3, 5, 10, 15, 20, 40, or 80 megahertz (MHz)). Devices of the wireless communications system 100 (such as, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (such as, a sub-band, a BWP) or all of a carrier bandwidth.

Signal waveforms transmitted over a carrier may be made up of multiple subcarriers (such as, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as, a duration of one modulation symbol) and one subcarrier, where the symbol period and subcarrier spacing are inversely related. The number of bits carried by each resource element may depend on the modulation scheme (such as, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as, 10 milliseconds (ms)). Each radio frame may be identified by a system frame number (SFN) (such as, ranging from 0 to 1023).

Each frame may include multiple consecutively numbered subframes or slots, and each subframe or slot may have the same duration. In some examples, a frame may be divided (such as, in the time domain) into subframes, and each subframe may be further divided into a number of slots. Alternatively, each frame may include a variable number of slots, and the number of slots may depend on subcarrier spacing. Each slot may include a number of symbol periods (such as, depending on the length of the cyclic prefix prepended to each symbol period). In some wireless communications systems 100, a slot may further be divided into multiple mini-slots containing one or more symbols. Excluding the cyclic prefix, each symbol period may contain one or more (such as, $N_f$) sampling periods. The duration of a symbol period may depend on the subcarrier spacing or frequency band of operation.

A subframe, a slot, a mini-slot, or a symbol may be the smallest scheduling unit (such as, in the time domain) of the wireless communications system 100 and may be referred to as a transmission time interval (TTI). In some examples, the TTI duration (such as, the number of symbol periods in a TTI) may be variable. Additionally, or alternatively, the smallest scheduling unit of the wireless communications system 100 may be dynamically selected (such as, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as, a control resource set (CORESET)) for a physical control channel may be defined by a number of symbol periods and may extend across the system bandwidth or a subset of the system bandwidth of the carrier. One or more control regions (such as, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (such as, over a carrier) and may be associated with an identifier for distinguishing neighboring cells (such as, a physical cell identifier (PCID), a virtual cell identifier (VCID), or others). In some examples, a cell also may refer to a geographic coverage area 110 or a portion of a geographic coverage area 110 (such as, a sector) over which the logical communication entity operates. Such cells may range from smaller areas (such as, a structure, a subset of structure) to larger areas depending on various factors such as the capabilities of the base station 105. For example, a cell may be or include a building, a subset of a building, or exterior spaces between or overlapping with geographic coverage areas 110, among some other examples.

A macro cell generally covers a relatively large geographic area (such as, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (such as, licensed, unlicensed) frequency bands as macro cells. Small cells may provide unrestricted access to the UEs 115 with service subscriptions with the network provider or may provide restricted access to the UEs 115 having an association with the small cell (such as, the UEs 115 in a closed subscriber group (CSG), the UEs 115 associated with users in a home or office). A base station 105 may support one or multiple cells and also may support communications over the one or more cells using one or multiple component carriers.

In some examples, a carrier may support multiple cells, and different cells may be configured according to different protocol types (such as, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as, a mobility management entity (MME), an access and mobility management function (AMF)) and at least one user plane entity that routes packets or interconnects to external networks (such as, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (such as, radio heads and ANCs) or consolidated into a single network device (such as, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (such as, LAA). Operations in unlicensed spectrum may include downlink transmissions, uplink transmissions, P2P transmissions, or D2D transmissions, among some other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (such as, a base station 105, a UE 115) to shape or steer an antenna beam (such as, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (such as, antenna panels) to conduct beamforming operations for directional communications with a UE 115. Some signals (such as, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (such as, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (such as, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (such as, by a base station 105 or a UE 115) may be performed using multiple beam directions, and the device may use a combination of digital precoding or radio frequency beamforming to generate a combined beam for transmission (such as, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (such as, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (such as, for identifying a beam direction for subsequent transmission or reception by the UE 115) or for transmitting a signal in a single direction (such as, for transmitting data to a receiving device).

A receiving device (such as, a UE 115) may try multiple receive configurations (such as, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as, when receiving a data signal). The single receive configuration may be aligned in a beam direction determined based on listening according to different receive configuration directions (such as, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (such as, using a cyclic redundancy check (CRC)), forward error correction (FEC), and retransmission (such as, automatic repeat request (ARQ)). HARQ may improve throughput at the MAC layer in poor radio conditions (such as, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a configuration message indicating a first beam associated with an uplink control transmission (such as, a PUCCH transmission). The UE 115 may receive DCI including a grant for an uplink data transmission (such as, a PUSCH transmission). The DCI may indicate a second beam associated with the uplink data transmission. In some examples, the beam indication also can be referred as a transmission configuration indication (TCI) or spatial relationship information (SRI) indication, in which a reference signal such as a synchronization signal block (SSB), a CSI-RS, or sounding reference signal (SRS) is provided. In some implementations, the UE 115 may apply the same spatial filter or quasi-co-location (QCL) assumption as the reference signal for the uplink transmission. For example, a TCI state identity with a reference signal of QCL type D or a spatial relationship information with an SRS resource identity can be configured for the PUCCH in the beam indication (such as, the indication of the first beam provided by the configuration message). In another example, a TCI codepoint which is mapped with a TCI state identity with a reference signal of QCL type D or an SRS resource indicator codepoint which refers to an SRS resource identity can be indicated for the PUSCH in the beam indication (such as, the indication of the second beam provided by the DCI). In an aspect, the UE 115 may select the first beam or the second beam for transmitting both the uplink control transmission and the uplink data transmission based on an overlap in time between the uplink control transmission and the uplink data transmission. In some aspects, the UE 115 may select the first beam or the second beam based on a set of rules or criteria. In an example, the UE 115 may select between the first beam and the second beam based on a first priority associated with the first beam and a second priority associated with the second beam. The priorities associated with the beams may include physical layer priorities. The UE 115 may transmit at least a portion of the uplink control transmission and at least a portion of the uplink data transmission using the selected first beam or second beam.

Figure 2:
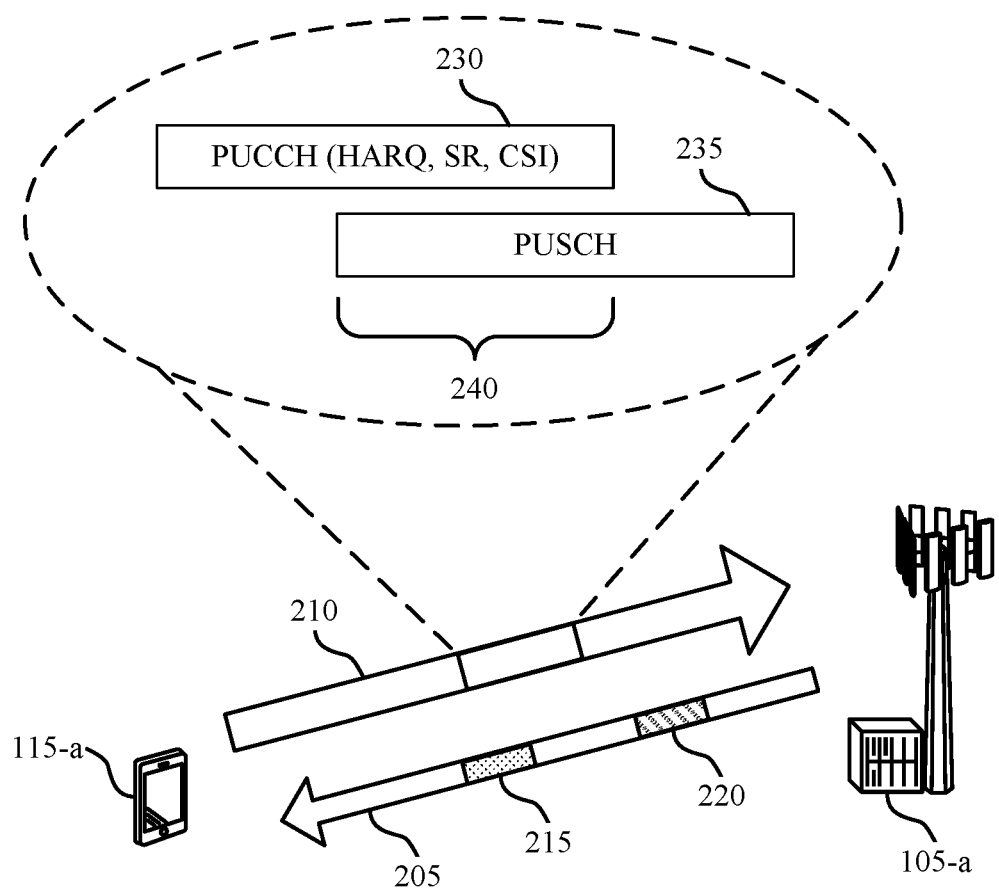
FIG. 2 shows a schematic diagram of an example system that supports QCL assumption of simultaneous PUCCH and PUSCH.

FIG. 2 shows a schematic diagram 200 of an example system that supports QCL assumption of simultaneous PUCCH and PUSCH. In some examples, wireless communications system 200 may implement aspects of wireless communication system 100 and may include a UE 115-a and a base station 105-a, which may be examples of a UE 115 and a base station 105, respectively, described with reference to FIG. 1. The base station 105-a and the UE 115-a may communicate with one another within a coverage area using downlink communications 205 and uplink communications 210 and using techniques described with reference to FIG. 1.

The UE 115-a may receive a configuration message 215 from the base station 105-a. The configuration message 215 may indicate a first beam associated with an uplink control transmission (such as, a PUCCH 230). For example, the configuration message 215 may indicate scheduling information associated with the uplink control transmission (such as, PUCCH 230) and a beam (such as, the first beam) associated with the uplink control transmission. The uplink control transmission (such as, a PUCCH 230) may include HARQ feedback, an SR, or CSI reporting information. In some aspects, the UE 115-a may receive the configuration message 215 over RRC signaling. For example, the configuration message 215 may include an RRC message indicating the first beam associated with the uplink control transmission. In an example, the RRC message may indicate scheduling information associated with the uplink control transmission (such as, PUCCH 230) and a beam (such as, the first beam) associated with the uplink control transmission. The UE 115-a may receive DCI 220 from the base station 105-a. The DCI 220 may be a DCI message. The DCI 220 may include a grant for an uplink data transmission (such as, a PUSCH 235). In an example, the DCI 220 may indicate a second beam associated with the uplink data transmission.

The UE 115-a may determine an overlap 240 (such as, in the time domain) between the uplink control transmission (such as, PUCCH 230) and the uplink data transmission (such as, PUSCH 235). In some aspects, the UE 115-a may determine the overlap 240 based on scheduling information indicated in the configuration message 215 (such as, RRC message) for the first beam and scheduling information indicated in the DCI 220 for the second beam. For example, the UE 115-a may determine the overlap 240 for examples in which the PUCCH 230 and the PUSCH 235 are scheduled in the same serving cell and overlap in time. In some implementations, the UE 115-a may determine the overlap 240 for cases in which the PUCCH 230 and the PUSCH 235 are respectively scheduled in two different serving cells configured in the operation of intra-band carrier aggregation. The UE 115-a may select the first beam or the second beam for transmitting both the uplink control transmission (such as, PUCCH 230) and the uplink data transmission (such as, PUSCH 235) based on the overlap 240. In some aspects, the UE 115 may select the first beam or the second beam based on a set of rules or criteria associated with the first beam and the second beam. In an example, the UE 115-a may select between the first beam and the second beam based on a first priority associated with the first beam and a second priority associated with the second beam. The priorities associated with the beams may include physical layer (PHY) priorities.

In an example, the UE 115-a may select the first beam for transmitting both the uplink control transmission (such as, PUCCH 230) and the uplink data transmission (such as, PUSCH 235) based on the overlap 240. In another example, the UE 115-a may select the second beam for transmitting both the uplink control transmission (such as, PUCCH 230) and the uplink data transmission (such as, PUSCH 235) based on the overlap 240. The UE 115-a may transmit uplink communications 210 using the selected beam (such as, the selected first beam or second beam). For example, the UE 115-a may transmit at least a portion of the uplink control transmission and at least a portion of the uplink control transmission (such as, PUCCH 230) and the uplink data transmission (such as, PUSCH 235) using the selected beam. In some examples, the UE 115-a may transmit the entirety of the uplink control transmission (such as, PUCCH 230) and the entirety of the uplink data transmission (such as, PUSCH 235) using the selected beam. In some other examples, the UE 115-a may transmit an overlapped portion of the uplink control transmission (such as, PUCCH 230) and an overlapped portion of the uplink data transmission (such as, PUSCH 235) using the selected beam.

The UE 115-a may multiplex at least the overlapping portions of the uplink control transmission (such as, PUCCH 230) and the uplink data transmission (such as, PUSCH 235) when transmitting the uplink control transmission (such as, PUCCH 230) and the uplink data transmission (such as, PUSCH 235) using a selected beam. The uplink control transmission (such as, PUCCH 230) transmitted over the selected beam may include HARQ feedback and CSI reporting information. In some aspects, the UE 115-a may respectively transmit the uplink control transmission (such as, PUCCH 230) and the uplink data transmission (such as, PUSCH 235) using different serving cells (such as, component carriers configured by the configuration message 215 and the DCI 220).

In another aspect, the UE 115-a may transmit the uplink control transmission (such as, PUCCH 230) and the uplink data transmission (such as, PUSCH 235) using the same serving cell (such as, component carrier). For example, the uplink control transmission (such as, PUCCH 230) and the uplink data transmission (such as, PUSCH 235) may overlap in the time domain using different resources of a serving cell. In another example, the UE 115-a may multiplex the uplink control transmission (such as, PUCCH 230) and the uplink data transmission (such as, PUSCH 235) in the frequency domain (such as, frequency division multiplexing). In some other aspects, the UE 115-a may respectively transmit the uplink control transmission (such as, PUCCH 230) and the uplink data transmission (such as, PUSCH 235) using different intra-band serving cells (such as, intra-band component carriers) associated with intra-band carrier aggregation.

The example aspects described herein may be advantageous over some wireless communications systems which do not support transmitting both the uplink control transmission (such as, PUCCH 230) and the uplink data transmission (such as, PUSCH 235) over the same beam for cases in which the uplink control transmission (such as, PUCCH 230) and the uplink data transmission (such as, PUSCH 235) at least partially overlap in time. For example, in cases in which an uplink control transmission (such as, PUCCH 230) including HARQ feedback, an SR, or CSI reporting information and an uplink data transmission (such as, PUSCH 235) overlap (such as, in the time domain), some UEs may transmit the uplink data transmission (such as, PUSCH 235) and refrain from transmitting the uplink control transmission (such as, PUCCH 230). In some implementations, for example, some UEs may include the HARQ feedback, SR, or CSI reporting information in the uplink data transmission (such as, PUSCH 235).

Accordingly, the example aspects described herein may increase spectrum utilization and spectral efficiency, advantageously utilizing resources to transmit both the uplink control transmission (such as, PUCCH 230) and the uplink data transmission (such as, PUSCH 235) in cases of overlap between the uplink control transmission (such as, PUCCH 230) and the uplink data transmission (such as, PUSCH 235), compared to other wireless communications systems which refrain from transmitting the uplink control transmission (such as, PUCCH 230).

Figure 3:
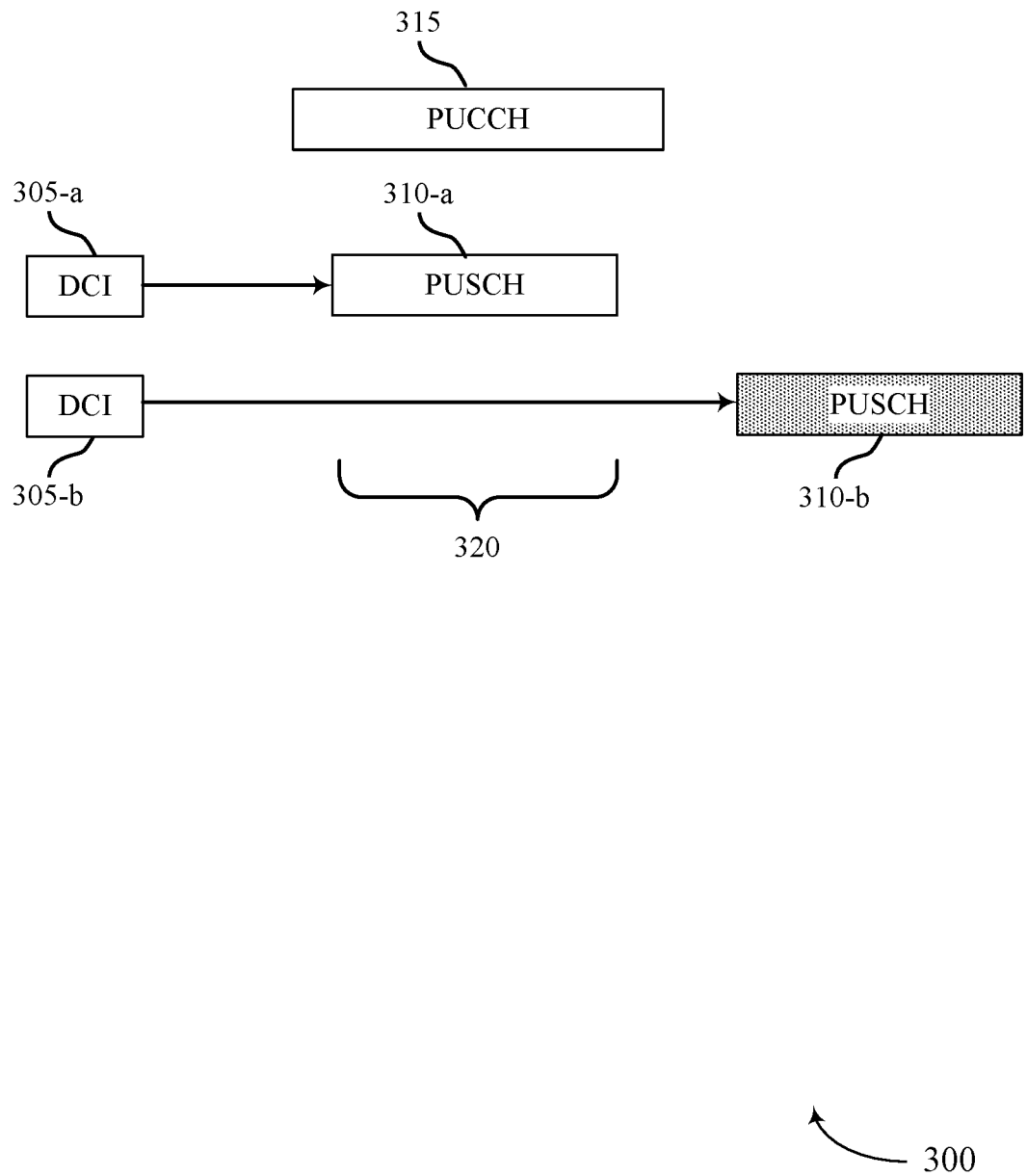
FIG. 3 shows an example block diagram that supports QCL assumption of simultaneous PUCCH and PUSCH.

FIG. 3 shows an example block diagram 300 that supports QCL assumption of simultaneous PUCCH and PUSCH. The example 300 may implement aspects of wireless communication systems 100 or 200. The PUCCH 315 and may be an example of the uplink control transmission (such as, a PUCCH 230) as described with reference to FIG. 2. The PUSCH 310-a and the PUSCH 310-b may be examples of the uplink data transmission (such as, a PUSCH 235) as described with reference to FIG. 2. Additionally, DCI 305-a and DCI 305-b may be examples of the DCI 220 as described with reference to FIG. 2.

With reference to FIG. 2, the UE 115-a may be configured for transmissions using a single antenna panel of the UE 115-a for simultaneous transmission of an uplink control transmission (i.e., PUCCH 315) and an uplink data transmission (such as, PUSCH 310-a) which overlap (such as, in the time domain, as shown by overlap 320). In some aspects, simultaneous transmission of the uplink control transmission (i.e., PUCCH 315) and the uplink data transmission (such as, PUSCH 310-a) using the same serving cell (such as, component carrier) may be enabled. In some other aspects, simultaneous transmission of the uplink control transmission (i.e., PUCCH 315) and the uplink data transmission (such as, PUSCH 310-a) using different intra-band serving cells (such as, intra-band component carriers) associated with intra-band carrier aggregation (CA) may be enabled.

The UE 115-a may receive a configuration message (such as, an RRC message) from the base station 105-a. The configuration message may indicate a first beam associated with the uplink control transmission (such as, PUCCH 315). Additionally, the UE 115-a may receive DCI 305-a (such as, a DCI message) from the base station 105-a. The DCI 305-a may include a grant for the uplink data transmission (such as, PUSCH 310-a). In an example, the DCI 305-a may indicate a second beam associated with the uplink data transmission (such as, PUSCH 310-a).

The UE 115-a may select the first beam associated with the uplink control transmission (such as, PUCCH 315) or the second beam associated with the uplink data transmission (such as, PUSCH 310-a) for transmitting both the uplink control transmission (such as, PUCCH 315) and the uplink data transmission (such as, PUSCH 310-a). In an example, the UE 115-a may select the first beam associated with the uplink control transmission (such as, PUCCH 315) or the second beam associated with the uplink data transmission (such as, PUSCH 310-a) based on a first priority associated with the first beam and a second priority associated with the second beam. For example, the UE 115-a may determine that a first priority associated with the first beam is greater than a second priority associated with the second beam, and the UE 115-a may select the first beam associated with the uplink control transmission (such as, PUCCH 315) based on the higher priority of the first beam. The UE 115-a may determine the first priority is the greater of the priorities, for example, based on an association between the first beam and the uplink control transmission (such as, PUCCH 315).

In some aspects, the UE 115-a may select the first beam associated with the uplink control transmission (such as, PUCCH 315) for transmitting both the uplink control transmission (such as, PUCCH 315) and the uplink data transmission (such as, PUSCH 310-a). The UE 115-a may transmit, to the base station 105-a, at least the overlapping portions of the uplink control transmission (such as, PUCCH 315) and the uplink data transmission (such as, PUSCH 310-a) using the selected first beam. Accordingly, for an uplink control transmission (such as, PUCCH 315) and an uplink data transmission (such as, PUSCH 310-a) which overlap (such as, in the time domain), the UE 115-a may schedule the transmission of both the uplink control transmission (such as, PUCCH 315) and the uplink data transmission (such as, PUSCH 310-a) over an antenna panel of the UE 115-a, using a beam associated with transmitting the uplink control transmission (such as, PUCCH 315).

In another aspect, the UE 115-a may select the second beam associated with the uplink data transmission (such as, PUSCH 310-a) for transmitting both the uplink control transmission (such as, PUCCH 315) and the uplink data transmission (such as, PUSCH 310-a). For example, the first beam for transmitting the uplink control transmission (such as, PUCCH 315) is overridden as the second beam for transmitting the uplink data transmission (such as, PUSCH 310-a). The UE 115-a may transmit, to the base station 105-a, at least the overlapping portions of the uplink control transmission (such as, PUCCH 315) and the uplink data transmission (such as, PUSCH 310-a) using the selected second beam. Accordingly, for an uplink control transmission (such as, PUCCH 315) and an uplink data transmission (such as, PUSCH 310-a) which overlap (such as, in the time domain), the UE 115-a may schedule the transmission of both the uplink control transmission (such as, PUCCH 315) and the uplink data transmission (such as, PUSCH 310-a) over an antenna panel of the UE 115-a, using a beam associated with transmitting the uplink data transmission (such as, PUSCH 310-a).

In some other aspects, the UE 115-a may determine that the second beam indicated in the DCI 305-a (such as, the second beam associated with the uplink data transmission (such as, PUSCH 310-a)) is the same as the first beam indicated in the configuration message (such as, the first beam associated with the uplink control transmission (such as, PUCCH 315)). Accordingly, the UE 115-a may schedule the transmission of both the uplink control transmission (such as, PUCCH 315) and the uplink data transmission (such as, PUSCH 310-a) based on determining that the first beam and the second beam are the same (such as, using the common beam).

Figure 4:
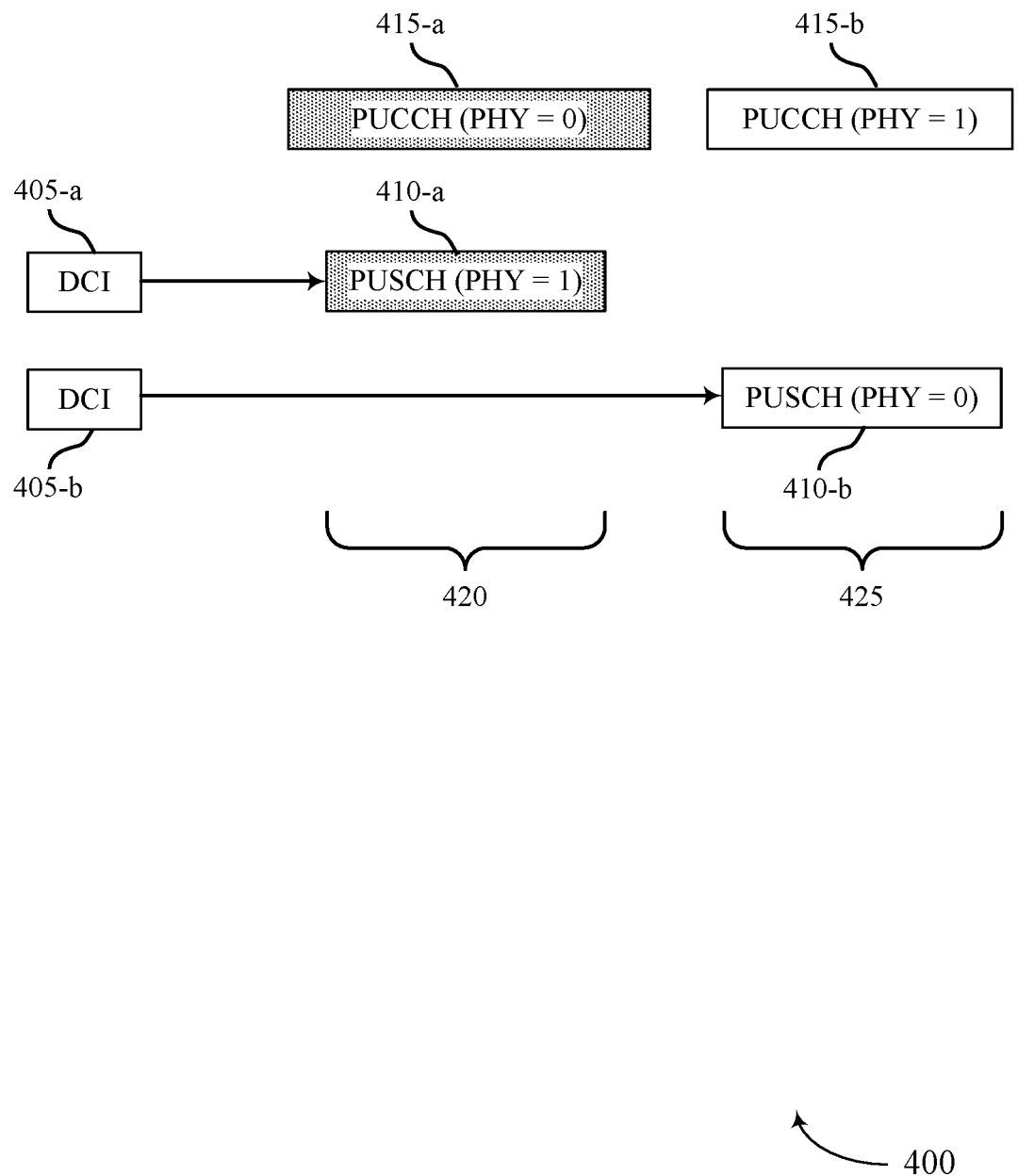
FIG. 4 shows an example block diagram that supports QCL assumption of simultaneous PUCCH and PUSCH.

FIG. 4 shows an example block diagram 400 that supports QCL assumption of simultaneous PUCCH and PUSCH. The example 400 may implement aspects of wireless communication systems 100 or 200 or example 300. The PUCCH 415-a and PUCCH 415-b may be examples of the uplink control transmission (such as, a PUCCH 240) as described with reference to FIG. 2. The PUSCH 410-a and the PUSCH 410-b may be examples of the uplink data transmission (such as, a PUSCH 245) as described with reference to FIG. 2. Additionally, DCI 405-a and DCI 405-b may be examples of the DCI 220 as described with reference to FIG. 2.

With reference to FIG. 2, the UE 115-a may be configured for transmissions using a single antenna panel of the UE 115-a for simultaneous transmission of an uplink control transmission (such as, PUCCH 415-a, PUCCH 415-b) and an uplink data transmission (such as, PUSCH 410-a, PUSCH 410-b) which overlap (such as, in the time domain, as shown by overlap 420 and overlap 425). In some aspects, simultaneous transmission of the uplink control transmission (such as, PUCCH 415-a, PUCCH 415-b) and the uplink data transmission (such as, PUSCH 410-a, PUSCH 410-b) using the same serving cell (such as, component carrier) may be enabled. In some other aspects, simultaneous transmission of the uplink control transmission (such as, PUCCH 415-a, PUCCH 415-b) and the uplink data transmission (such as, PUSCH 410-a, PUSCH 410-b) using different intra-band serving cells (such as, intra-band component carriers) associated with intra-band carrier aggregation may be enabled.

The UE 115-a may receive a configuration message (such as, an RRC message) from the base station 105-a. The configuration message may indicate a first beam associated with the uplink control transmission (such as, PUCCH 415-a). Additionally, the UE 115-a may receive DCI 405-a (such as, a DCI message) from the base station 105-a. The DCI 405-a may include a grant for the uplink data transmission (such as, PUSCH 410-a). In an example, the DCI 405-a may indicate a second beam associated with the uplink data transmission (such as, PUSCH 410-a). In some aspects, the configuration message may indicate a beam associated with another uplink control transmission (such as, PUCCH 415-b), and the UE 115-a may receive DCI 405-b (such as, a DCI message) including a grant for another uplink data transmission (such as, PUSCH 410-b).

The UE 115-a may receive an indication of a first priority associated with the first beam associated with the uplink control transmission (such as, PUCCH 415-a). The UE 115-a may receive an indication of a second priority associated with the second beam associated with the uplink data transmission (such as, PUSCH 410-a). In some aspects, the first priority associated with the first beam and the second priority associated with the second beam may include physical layer priorities. The priorities may indicate, for example, whether the first beam and the second beam are each associated with a high priority service (such as, ultra-reliable low-latency communication (URLLC)) or a lower priority service (such as, enhanced mobile broadband (eMBB)). For example, the priorities can have a value of 0 or 1. In an example, the URLLC service can be indicated with a priority value of 1 and the eMBB service can be indicated with a priority value of 0.

In some aspects, the UE 115-a may select the first beam or the second beam based on a difference between the first priority associated with the first beam and the second priority associated with the second beam. For example, the first beam associated with the uplink control transmission (such as, PUCCH 415-a) may have a relatively lower physical layer priority (such as, PHY=0), and the second beam associated with the uplink data transmission (such as, PUSCH 410-a) may have a relatively higher physical layer priority (such as, PHY=1). In an example, the UE 115-a may select the second beam associated with the uplink data transmission (such as, PUSCH 410-a) based on the higher physical layer priority.

Accordingly, for an uplink control transmission (such as, PUCCH 415-a) and an uplink data transmission (such as, PUSCH 410-a) which overlap (such as, in the time domain), the UE 115-a may schedule the transmission of both the uplink control transmission (such as, PUCCH 415-a) and the uplink data transmission (such as, PUSCH 410-a) over an antenna panel of the UE 115-a, using a beam having a higher physical layer priority (such as, the second beam associated with transmitting the uplink data transmission (such as, PUSCH 410-a)).

Figure 5:
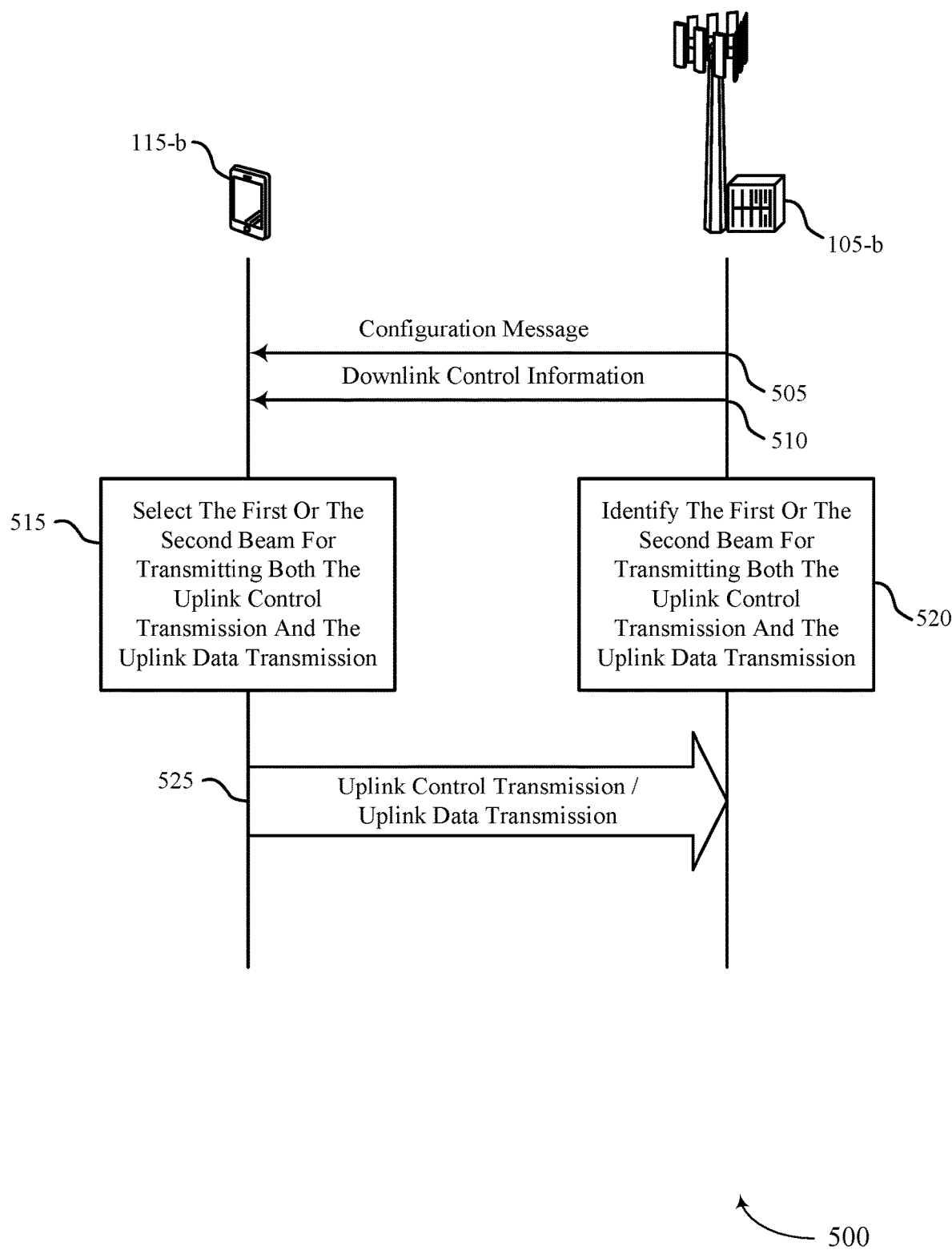
FIG. 5 shows an example process flow for operating devices that supports QCL assumption of simultaneous PUCCH and PUSCH.

FIG. 5 shows an example process flow 500 for operating devices that supports QCL assumption of simultaneous PUCCH and PUSCH. In some examples, the process flow 500 may implement aspects of wireless communications systems 100 or 200. Additionally, the process flow 500 may implement aspects of examples 300 and 400. Further, the process flow 500 may be implemented by a UE 115-b and a base station 105-b, which may be examples of a UE 115 and a base station 105 described with reference to FIGS. 1 and 2.

In the following description of the process flow 500, the operations between the UE 115-b and the base station 105-b may be transmitted in a different order than the order shown, or the operations performed by the base station 105-b and the UE 115-b may be performed in different orders or at different times. Certain operations also may be left out of the process flow 500, or other operations may be added to the process flow 500. It is to be understood that while the base station 105-b and the UE 115-b are shown performing a number of the operations of process flow 500, any wireless device may perform the operations shown At 505, the UE 115-b may receive a configuration message indicating a first beam associated with an uplink control transmission (such as, a PUCCH transmission). In some aspects, the configuration message may include an RRC message.

At 510, the UE 115-b may receive DCI including a grant for an uplink data transmission (such as, a PUSCH transmission). In some aspects, the DCI may indicate a second beam associated with the uplink data transmission.

At 515, the UE 115-b may select the first beam or the second beam for transmitting both the uplink control transmission and the uplink data transmission based on an overlap in time between the uplink control transmission and the uplink data transmission. In some aspects, the UE 115-b may select the first beam or the second beam for transmitting both the uplink control transmission and the uplink data transmission based on a first priority associated with the first beam and a second priority associated with the second beam.

At 520, the base station 105-b may identify the first beam or the second beam for a UE transmission of both the uplink control transmission and the uplink data transmission to the base station based on the overlap in time between the uplink control transmission and the uplink data transmission. In some aspects, the base station 105-b may identify the first beam or the second beam for transmitting both the uplink control transmission and the uplink data transmission based on the first priority associated with the first beam and the second priority associated with the second beam.

At 525, the UE 115-b may transmit at least a portion of the uplink control transmission and at least a portion of the uplink data transmission using the selected first beam or second beam.

Figure 6:
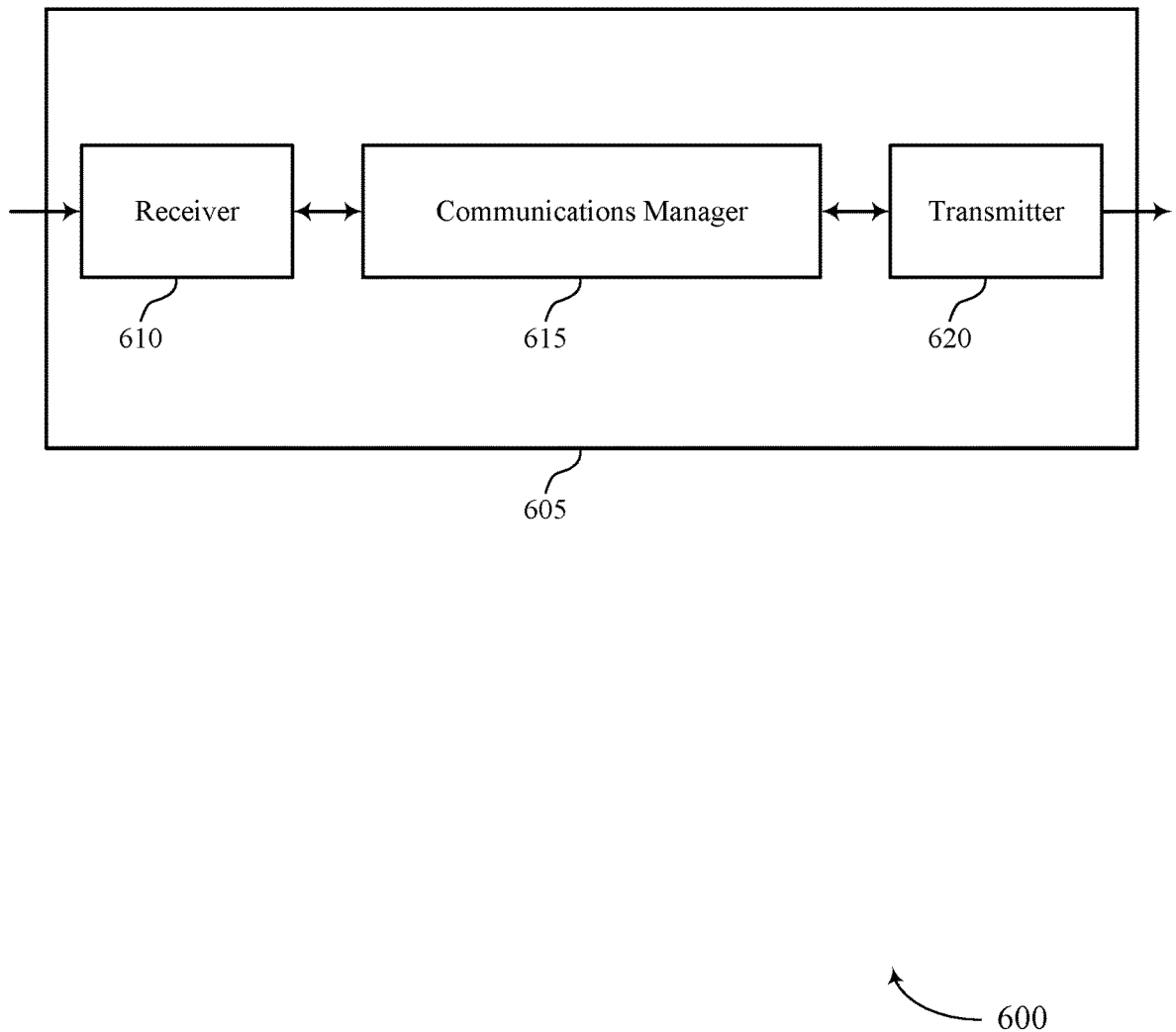
FIGS. 6 and 7 show block diagrams of example devices that support QCL assumption of simultaneous PUCCH and PUSCH.

FIG. 6 shows a block diagram 600 of a device 605 that supports QCL assumption of simultaneous PUCCH and PUSCH. The device 605 may be an example of aspects of a UE 115 as described herein. The device 605 may include a receiver 610, a communications manager 615, and a transmitter 620. The device 605 also may include a processor. Each of these components may be in communication with one another (such as, via one or more buses).

The receiver 610 may receive information such as packets, user data, or control information associated with various information channels (such as, control channels, data channels, and information related to QCL assumption of simultaneous PUCCH and PUSCH, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a configuration message indicating a first beam associated with an uplink control transmission, receive DCI including a grant for an uplink data transmission, the DCI indicating a second beam associated with the uplink data transmission, select the first beam or the second beam for transmitting both the uplink control transmission and the uplink data transmission based on an overlap in time between the uplink control transmission and the uplink data transmission, and transmit at least a portion of the uplink control transmission and at least a portion of the uplink data transmission using the selected first beam or second beam. The communications manager 615 may be an example of aspects of the communications manager 910 described herein.

The communications manager 615, or its sub-components, may be implemented in hardware, code (such as, software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
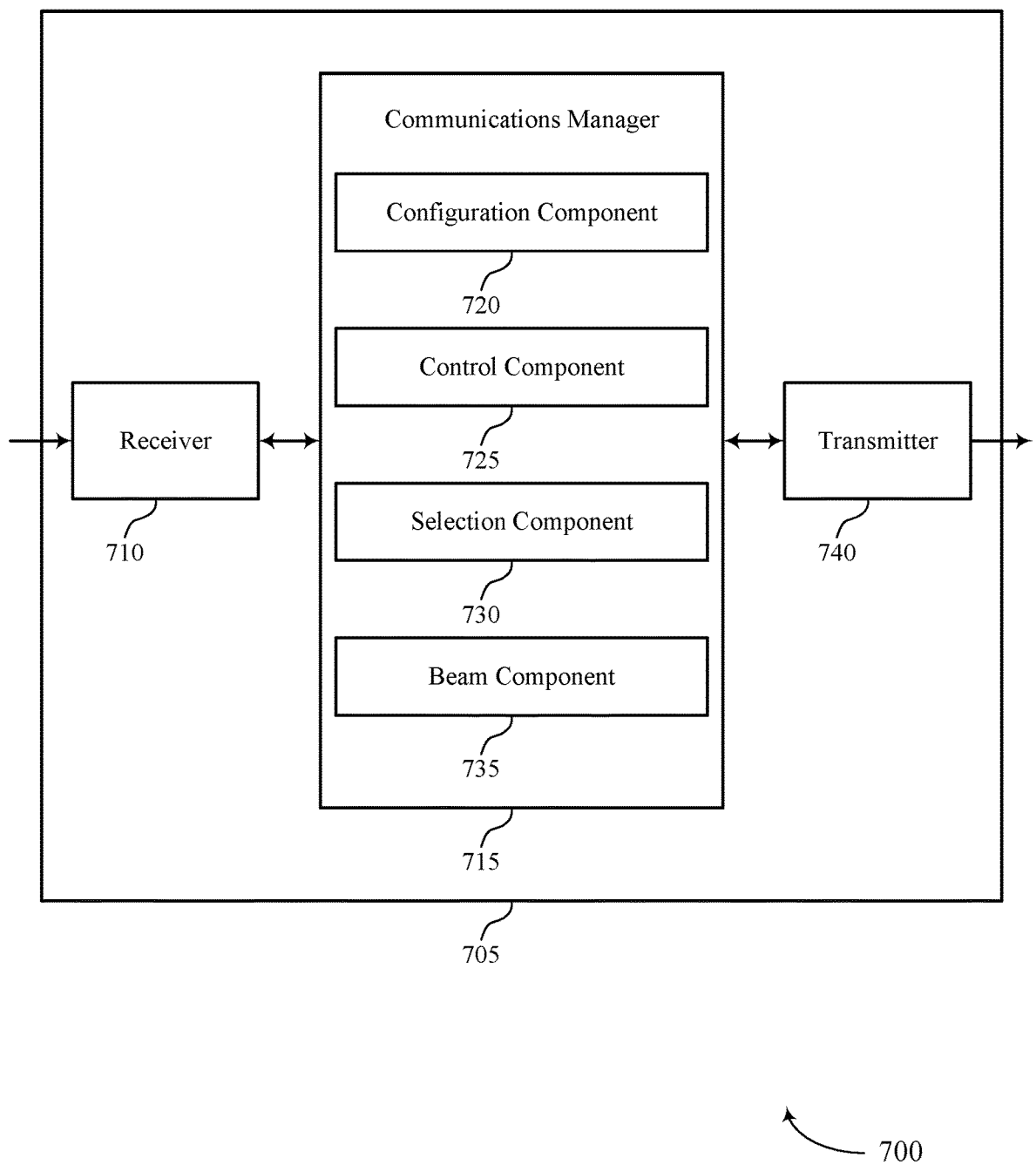

FIG. 7 shows a block diagram 700 of a device 705 that supports QCL assumption of simultaneous PUCCH and PUSCH. The device 705 may be an example of aspects of a device 605, or a UE 115 as described herein. The device 705 may include a receiver 710, a communications manager 715, and a transmitter 740. The device 705 also may include a processor. Each of these components may be in communication with one another (such as, via one or more buses).

The receiver 710 may receive information such as packets, user data, or control information associated with various information channels (such as, control channels, data channels, and information related to QCL assumption of simultaneous PUCCH and PUSCH, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration component 720, a control component 725, a selection component 730, and a beam component 735. The communications manager 715 may be an example of aspects of the communications manager 910 described herein.

The configuration component 720 may receive a configuration message indicating a first beam associated with an uplink control transmission.

The control component 725 may receive DCI including a grant for an uplink data transmission, the DCI indicating a second beam associated with the uplink data transmission.

The selection component 730 may select the first beam or the second beam for transmitting both the uplink control transmission and the uplink data transmission based on an overlap in time between the uplink control transmission and the uplink data transmission.

The beam component 735 may transmit at least a portion of the uplink control transmission and at least a portion of the uplink data transmission using the selected first beam or second beam.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
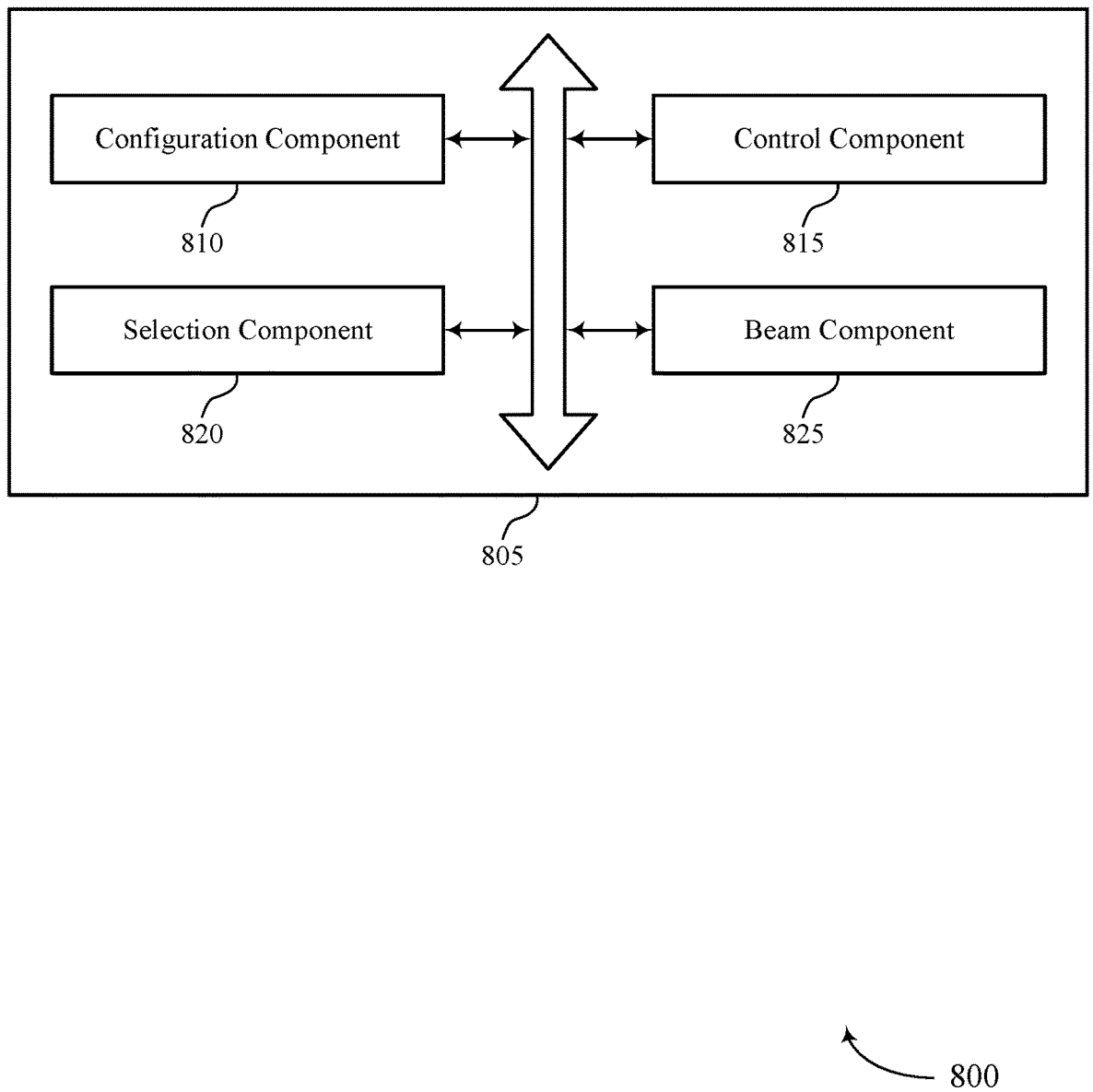
FIG. 8 shows a block diagram of an example communications manager that supports QCL assumption of simultaneous PUCCH and PUSCH.

FIG. 8 shows a block diagram 800 of a communications manager 805 that supports QCL assumption of simultaneous PUCCH and PUSCH. The communications manager 805 may be an example of aspects of a communications manager 615, a communications manager 715, or a communications manager 910 described herein. The communications manager 805 may include a configuration component 810, a control component 815, a selection component 820, and a beam component 825. Each of these modules may communicate, directly or indirectly, with one another (such as, via one or more buses).

The configuration component 810 may receive a configuration message indicating a first beam associated with an uplink control transmission.

The control component 815 may receive DCI including a grant for an uplink data transmission, the DCI indicating a second beam associated with the uplink data transmission.

The selection component 820 may select the first beam or the second beam for transmitting both the uplink control transmission and the uplink data transmission based on an overlap in time between the uplink control transmission and the uplink data transmission.

In some examples, the selection component 820 may select the first beam or the second beam for transmitting both the uplink control transmission and the uplink data transmission is based on a first priority associated with the first beam and a second priority associated with the second beam.

In some examples, the selecting includes selecting the first beam for transmitting both the uplink control transmission and the uplink data transmission based on the determining, and where the transmitting includes transmitting at least the portion of the uplink control transmission and at least the portion of the uplink data transmission using the selected first beam.

In some examples, the selecting includes selecting the second beam for transmitting both the uplink control transmission and the uplink data transmission based on the determining.

The beam component 825 may transmit at least a portion of the uplink control transmission and at least a portion of the uplink data transmission using the selected first beam or second beam.

In some examples, the beam component 825 may determine that the first priority associated with the first beam is greater than the second priority associated with the second beam based on an association between the first beam and the uplink control transmission.

In some examples, the transmitting includes transmitting at least the portion of the uplink control transmission and at least the portion of the uplink data transmission using the selected second beam.

In some examples, the beam component 825 may receive an indication of the first priority associated with the first beam and an indication of the second priority associated with the second beam, where the selecting the first beam or the second beam is based on a difference between the first priority associated with the first beam and the second priority associated with the second beam.

In some examples, the beam component 825 may determine, based on receiving the configuration message and the DCI, that the second beam associated with the uplink data transmission is the same as the first beam associated with the uplink control transmission.

In some examples, the beam component 825 may transmit at least the portion of the uplink control transmission and at least the portion of the uplink data transmission is based on the determination.

In some examples, the beam component 825 may transmit at least the portion of the uplink control transmission and at least the portion of the uplink data transmission over a single antenna panel of the UE.

In some implementations, the first priority associated with the first beam and the second priority associated with the second beam include physical layer priorities.

Figure 9:
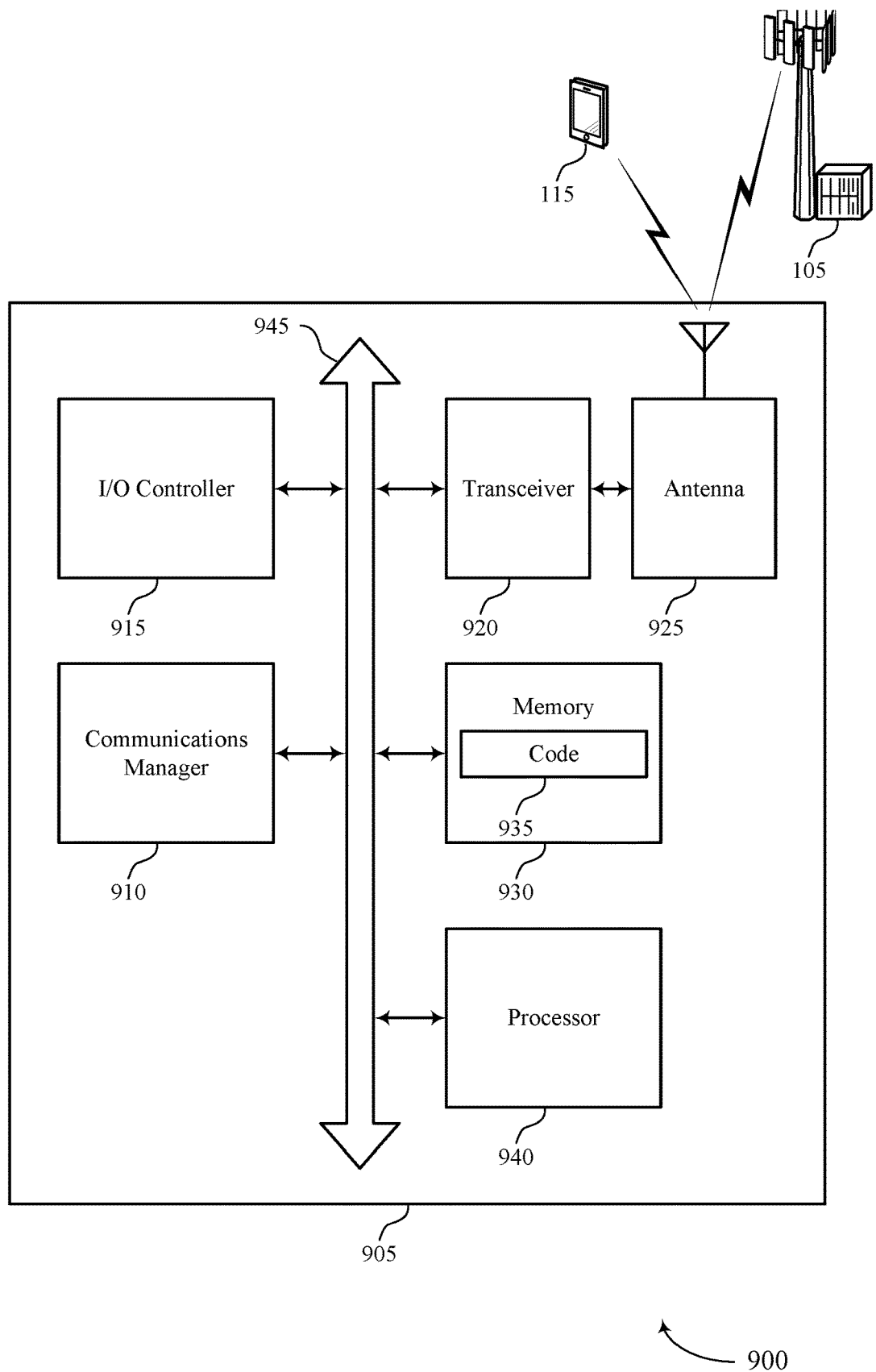
FIG. 9 shows a diagram of a system including an example device that supports QCL assumption of simultaneous PUCCH and PUSCH.

FIG. 9 shows a diagram of a system 900 including a device 905 that supports QCL assumption of simultaneous PUCCH and PUSCH. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (such as, bus 945).

The communications manager 910 may receive a configuration message indicating a first beam associated with an uplink control transmission, receive DCI including a grant for an uplink data transmission, the DCI indicating a second beam associated with the uplink data transmission, select the first beam or the second beam for transmitting both the uplink control transmission and the uplink data transmission based on an overlap in time between the uplink control transmission and the uplink data transmission, and transmit at least a portion of the uplink control transmission and at least a portion of the uplink data transmission using the selected first beam or second beam.

In some examples, the communications manager 910, when functioning as a processor or a processing system, may obtain signaling (for example, messages, indications, or any other signing that may be transmitted to the device 905) from the transceiver 920. For example, the communications manager 910 may obtain, from the transceiver 920, a configuration message indicating a first beam associated with an uplink control transmission, DCI including a grant for an uplink data transmission (the DCI indicating a second beam associated with the uplink data transmission), or both. Similarly, the communications manager 910 may also output signaling for transmission. For example, the communications manager 910 may output signaling to the transceiver 920 for transmission of at least a portion of the uplink control transmission and at least a portion of the uplink data transmission using the selected first beam or second beam.

The I/O controller 915 may manage input and output signals for the device 905. The I/O controller 915 also may manage peripherals not integrated into the device 905. In some implementations, the I/O controller 915 may represent a physical connection or port to an external peripheral. In some implementations, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some implementations, the I/O controller 915 may be implemented as part of a processor. In some implementations, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 also may include a modem to modulate the packets and provide the modulated packets to the antennas for transmission, and to demodulate packets received from the antennas.

In some implementations, the wireless device may include a single antenna 925. However, in some implementations the device may have more than one antenna 925, which may be capable of concurrently transmitting or receiving multiple wireless transmissions.

The memory 930 may include random-access memory (RAM) and read-only memory (ROM). In some implementations, the memory 930 may contain, among other things, a BIOS which may control basic hardware or software operation such as the interaction with peripheral components or devices.

The processor 940 may include an intelligent hardware device, (such as, a general-purpose processor, a DSP, a CPU, a microcontroller, an ASIC, an FPGA, a programmable logic device, a discrete gate or transistor logic component, a discrete hardware component, or any combination thereof). In some implementations, the processor 940 may be configured to operate a memory array using a memory controller. In other cases, a memory controller may be integrated into the processor 940.

The code 935 may include instructions to implement aspects of the present disclosure, including instructions to support wireless communications. In some implementations, the code 935 may not be directly executable by the processor 940 but may cause a computer (such as, when compiled and executed) to perform functions described herein.

In some implementations, controller/processor 940 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or sub-components of the device 905.

The processing system of the device 905 may interface with other components of the device 905, and may process information received from other components (such as inputs or signals), output information to other components, etc. For example, a chip or modem of the device 905 may include a processing system, a first interface to receive or obtain information, and a second interface to output, transmit or provide information. In some implementations, the first interface may refer to an interface between the processing system of the chip or modem and a receiver, such that the device 905 may receive information or signal inputs, and the information may be passed to the processing system. In some implementations, the second interface may refer to an interface between the processing system of the chip or modem and a transmitter, such that the device 905 may transmit information output from the chip or modem. A person having ordinary skill in the art will readily recognize that the second interface also may obtain or receive information or signal inputs, and the first interface also may output, transmit or provide information.

Figure 10:
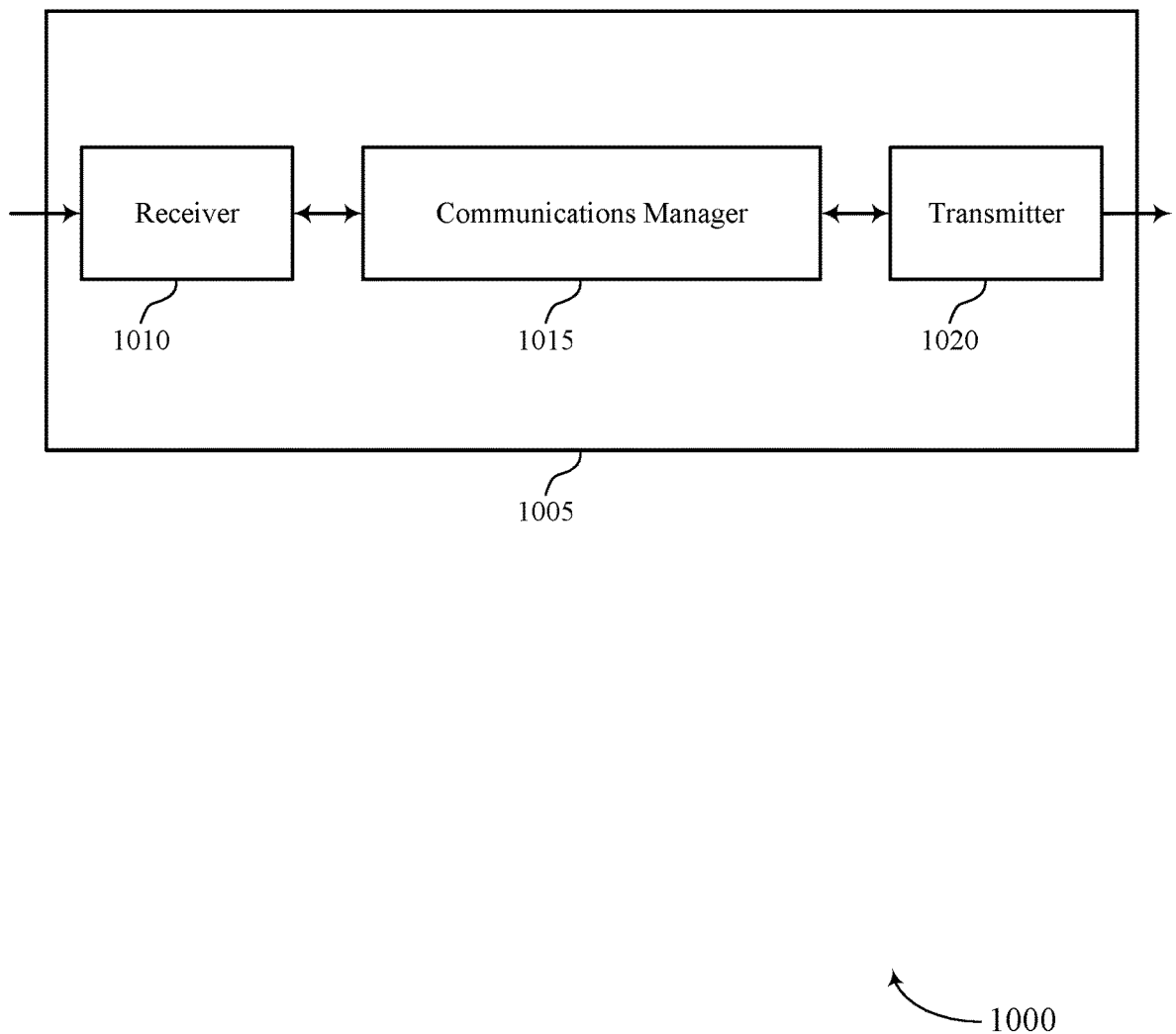
FIGS. 10 and 11 show block diagrams of example devices that support QCL assumption of simultaneous PUCCH and PUSCH.

FIG. 10 shows a block diagram 1000 of a device 1005 that supports QCL assumption of simultaneous PUCCH and PUSCH. The device 1005 may be an example of aspects of a base station 105 as described herein. The device 1005 may include a receiver 1010, a communications manager 1015, and a transmitter 1020. The device 1005 also may include a processor. Each of these components may be in communication with one another (such as, via one or more buses).

The receiver 1010 may receive information such as packets, user data, or control information associated with various information channels (such as, control channels, data channels, and information related to QCL assumption of simultaneous PUCCH and PUSCH, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a configuration message indicating a first beam associated with an uplink control transmission, transmit DCI including a grant for an uplink data transmission, the DCI specifying a second beam associated with the uplink data transmission, identify the first beam or the second beam for a UE transmission of both the uplink control transmission and the uplink data transmission to the base station based on an overlap in time between the uplink control transmission and the uplink data transmission, and receive at least a portion of the uplink control transmission and at least a portion of the uplink data transmission via the selected first beam or second beam. The communications manager 1015 may be an example of aspects of the communications manager 1310 described herein.

The communications manager 1015, or its sub-components, may be implemented in hardware, code (such as, software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
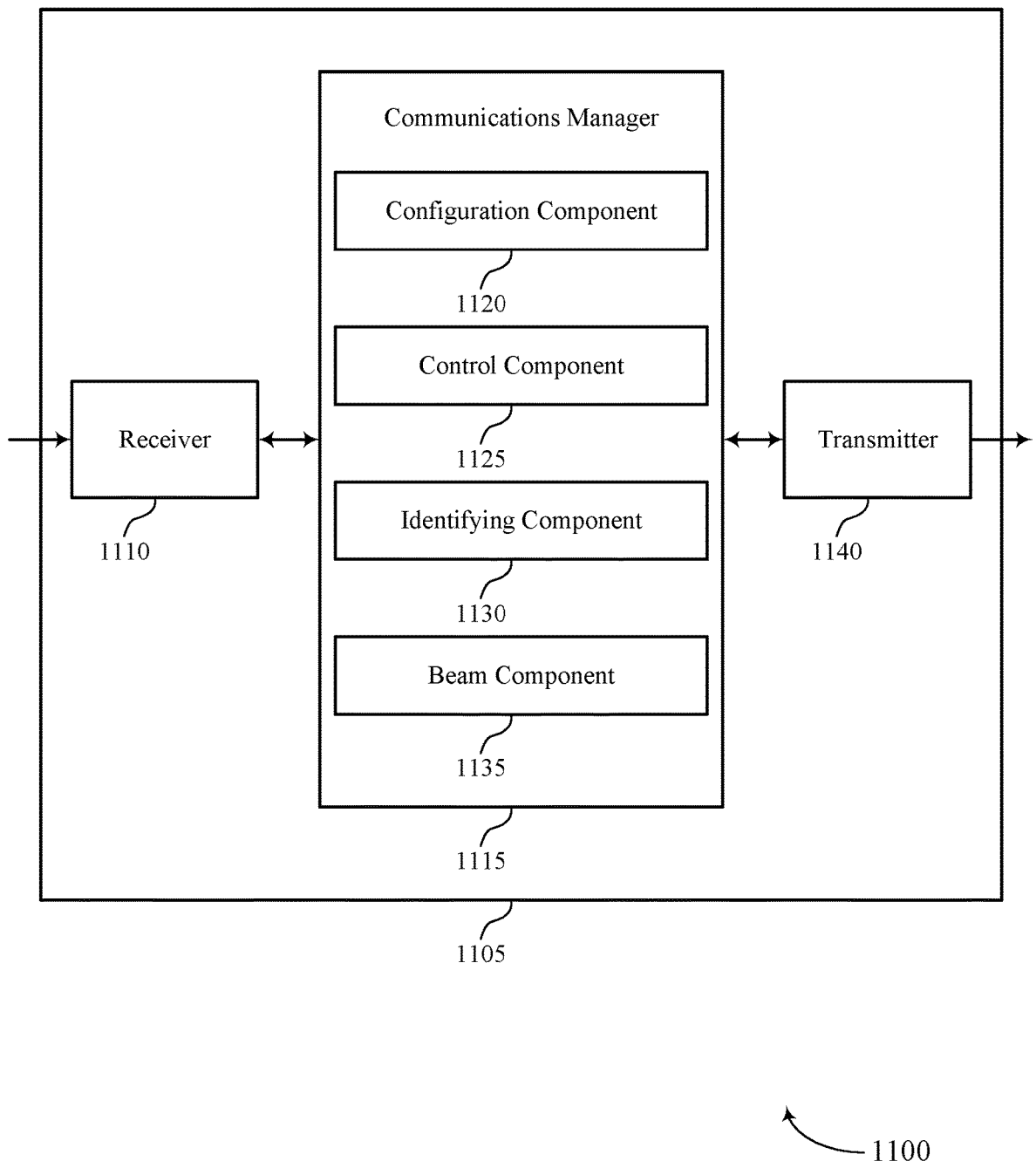

FIG. 11 shows a block diagram 1100 of a device 1105 that supports QCL assumption of simultaneous PUCCH and PUSCH. The device 1105 may be an example of aspects of a device 1005, or a base station 105 as described herein. The device 1105 may include a receiver 1110, a communications manager 1115, and a transmitter 1140. The device 1105 also may include a processor. Each of these components may be in communication with one another (such as, via one or more buses).

The receiver 1110 may receive information such as packets, user data, or control information associated with various information channels (such as, control channels, data channels, and information related to QCL assumption of simultaneous PUCCH and PUSCH, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration component 1120, a control component 1125, an identifying component 1130, and a beam component 1135. The communications manager 1115 may be an example of aspects of the communications manager 1310 described herein.

The configuration component 1120 may transmit a configuration message indicating a first beam associated with an uplink control transmission.

The control component 1125 may transmit DCI including a grant for an uplink data transmission, the DCI specifying a second beam associated with the uplink data transmission.

The identifying component 1130 may identify the first beam or the second beam for a UE transmission of both the uplink control transmission and the uplink data transmission to the base station based on an overlap in time between the uplink control transmission and the uplink data transmission.

The beam component 1135 may receive at least a portion of the uplink control transmission and at least a portion of the uplink data transmission via the selected first beam or second beam.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
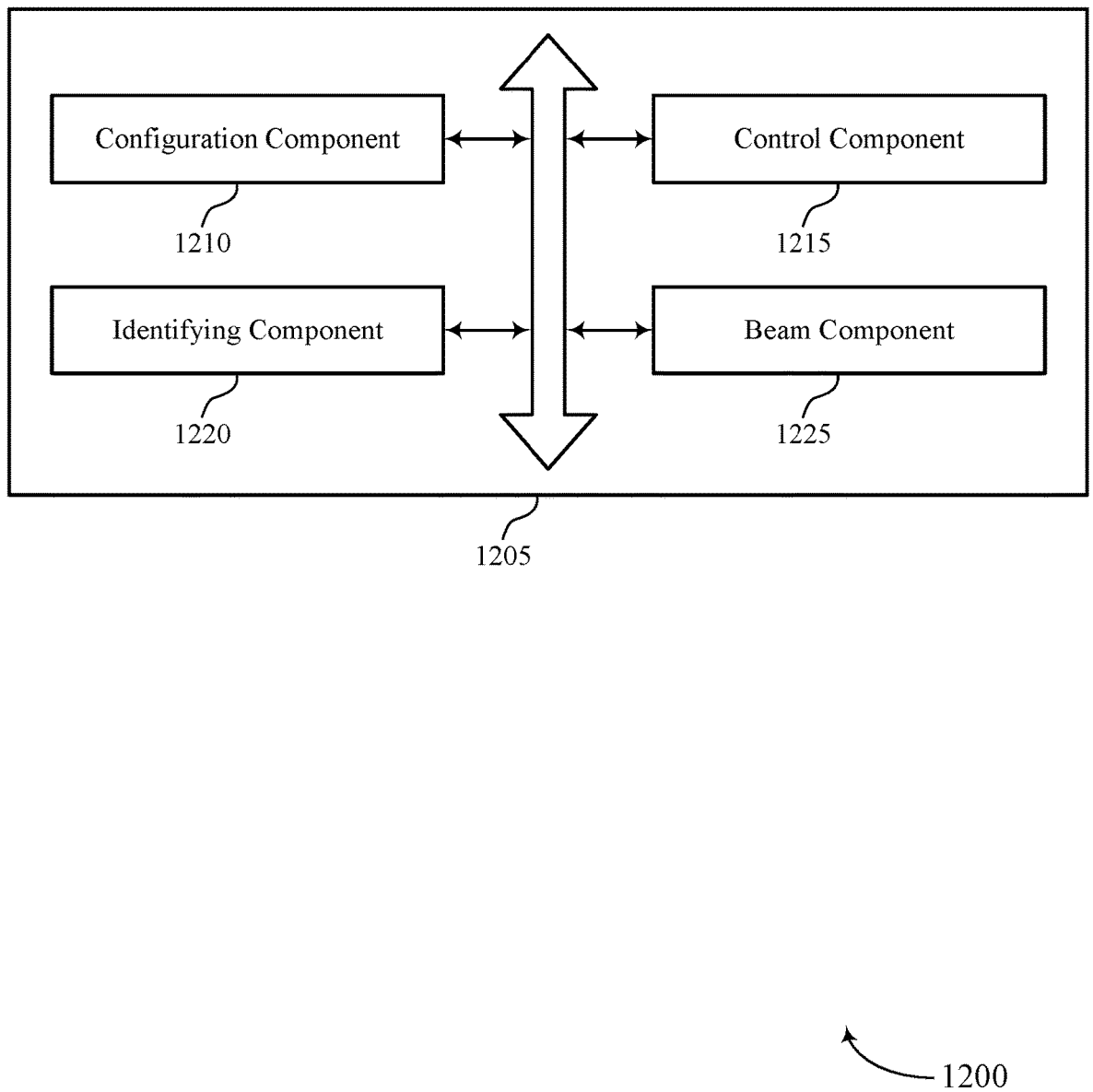
FIG. 12 shows a block diagram of an example communications manager that supports QCL assumption of simultaneous PUCCH and PUSCH.

FIG. 12 shows a block diagram 1200 of a communications manager 1205 that supports QCL assumption of simultaneous PUCCH and PUSCH. The communications manager 1205 may be an example of aspects of a communications manager 1015, a communications manager 1115, or a communications manager 1310 described herein. The communications manager 1205 may include a configuration component 1210, a control component 1215, an identifying component 1220, and a beam component 1225. Each of these modules may communicate, directly or indirectly, with one another (such as, via one or more buses).

The configuration component 1210 may transmit a configuration message indicating a first beam associated with an uplink control transmission.

The control component 1215 may transmit DCI including a grant for an uplink data transmission, the DCI specifying a second beam associated with the uplink data transmission.

The identifying component 1220 may identify the first beam or the second beam for a UE transmission of both the uplink control transmission and the uplink data transmission to the base station based on an overlap in time between the uplink control transmission and the uplink data transmission.

In some examples, the identifying includes identifying the first beam for the UE transmission of both the uplink control transmission and the uplink data transmission based on the determining, and where the receiving includes receiving at least the portion of the uplink control transmission and at least the portion of the uplink data transmission via the identified first beam.

In some examples, the identifying includes identifying the second beam for the UE transmission of both the uplink control transmission and the uplink data transmission based on the determining.

The beam component 1225 may receive at least a portion of the uplink control transmission and at least a portion of the uplink data transmission via the selected first beam or second beam.

In some examples, the beam component 1225 may identify the first beam or the second beam for the UE transmission of both the uplink control transmission and the uplink data transmission to the base station is based on a first priority associated with the first beam and a second priority associated with the second beam.

In some examples, the beam component 1225 may determine that the first priority associated with the first beam is greater than the second priority associated with the second beam based on an association between the first beam and the uplink control transmission.

In some examples, the receiving includes receiving at least the portion of the uplink control transmission and at least the portion of the uplink data transmission via the identified second beam.

In some examples, the beam component 1225 may transmit an indication of the first priority associated with the first beam and an indication of the second priority associated with the second beam, where the identifying the first beam or the second beam is based on a difference between the first priority associated with the first beam and the second priority associated with the second beam.

In some examples, the beam component 1225 may identify that the second beam associated with the uplink data transmission is the same as the first beam associated with the uplink control transmission.

In some examples, the beam component 1225 may receive at least the portion of the uplink control transmission and at least the portion of the uplink data transmission is based on the identification.

In some examples, the beam component 1225 may receive at least the portion of the uplink control transmission and at least the portion of the uplink data transmission over a single antenna panel of the base station.

In some implementations, the first priority associated with the first beam and the second priority associated with the second beam include physical layer priorities.

Figure 13:
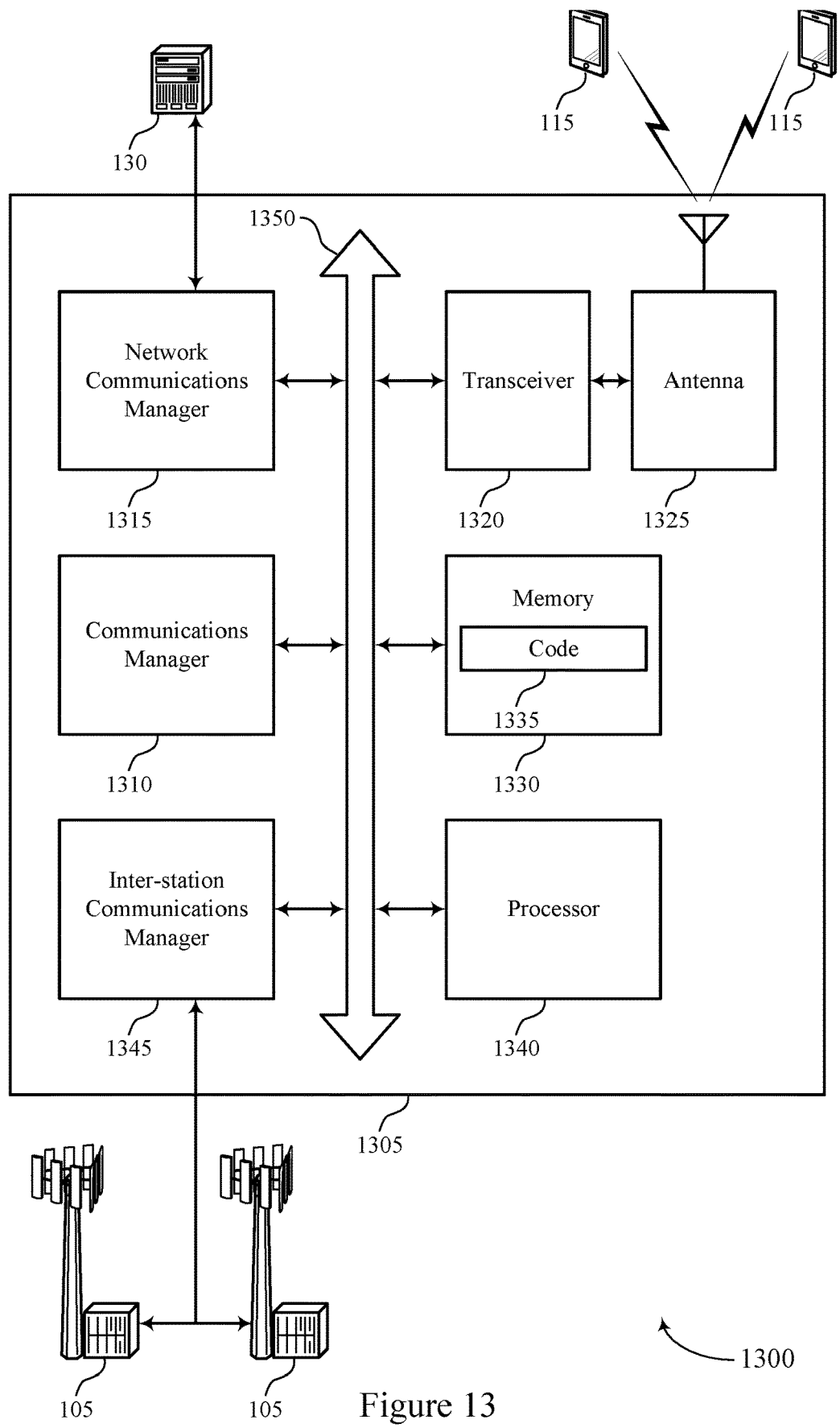
FIG. 13 shows a diagram of a system including an example device that supports QCL assumption of simultaneous PUCCH and PUSCH.

FIG. 13 shows a diagram of a system 1300 including a device 1305 that supports QCL assumption of simultaneous PUCCH and PUSCH. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (such as, bus 1350).

The communications manager 1310 may transmit a configuration message indicating a first beam associated with an uplink control transmission, transmit DCI including a grant for an uplink data transmission, the DCI specifying a second beam associated with the uplink data transmission, identify the first beam or the second beam for a UE transmission of both the uplink control transmission and the uplink data transmission to the base station based on an overlap in time between the uplink control transmission and the uplink data transmission, and receive at least a portion of the uplink control transmission and at least a portion of the uplink data transmission via the selected first beam or second beam.

In some examples, the communications manager 1310, when functioning as a processor or a processing system, may output signaling (for example, messages, indications, or any other signing that may be transmitted to the device 1305) to the transceiver 1320. For example, the communications manager 1310 may output, to the transceiver 1320, a configuration message indicating a first beam associated with an uplink control transmission, DCI including a grant for an uplink data transmission (the DCI indicating a second beam associated with the uplink data transmission), or both. Similarly, the communications manager 1310 may also obtain signaling for receiving transmissions. For example, the communications manager 1310 may obtain signaling from the transceiver 1320 for receiving at least a portion of the uplink control transmission and at least a portion of the uplink data transmission using the selected first beam or second beam.

The network communications manager 1315 may manage communications with the core network (such as, via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 also may include a modem to modulate the packets and provide the modulated packets to the antennas for transmission, and to demodulate packets received from the antennas.

In some implementations, the wireless device may include a single antenna 1325. However, in some implementations the device may have more than one antenna 1325, which may be capable of concurrently transmitting or receiving multiple wireless transmissions.

The memory 1330 may include RAM, ROM, or a combination thereof. In some implementations, the memory 1330 may contain, among other things, a BIOS which may control basic hardware or software operation such as the interaction with peripheral components or devices.

The processor 1340 may include an intelligent hardware device, (such as, a general-purpose processor, a DSP, a CPU, a microcontroller, an ASIC, an FPGA, a programmable logic device, a discrete gate or transistor logic component, a discrete hardware component, or any combination thereof). In some implementations, the processor 1340 may be configured to operate a memory array using a memory controller. In some implementations, a memory controller may be integrated into processor 1340.

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. In some implementations, the code 1335 may not be directly executable by the processor 1340 but may cause a computer (such as, when compiled and executed) to perform functions described herein.

In some implementations, controller/processor 1340 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305.

The processing system of the device 1305 may interface with other components of the device 1305, and may process information received from other components (such as inputs or signals), output information to other components, etc. For example, a chip or modem of the device 1305 may include a processing system, a first interface to receive or obtain information, and a second interface to output, transmit or provide information. In some implementations, the first interface may refer to an interface between the processing system of the chip or modem and a receiver, such that the device 1305 may receive information or signal inputs, and the information may be passed to the processing system. In some implementations, the second interface may refer to an interface between the processing system of the chip or modem and a transmitter, such that the device 1305 may transmit information output from the chip or modem. A person having ordinary skill in the art will readily recognize that the second interface also may obtain or receive information or signal inputs, and the first interface also may output, transmit or provide information.

Figure 14:
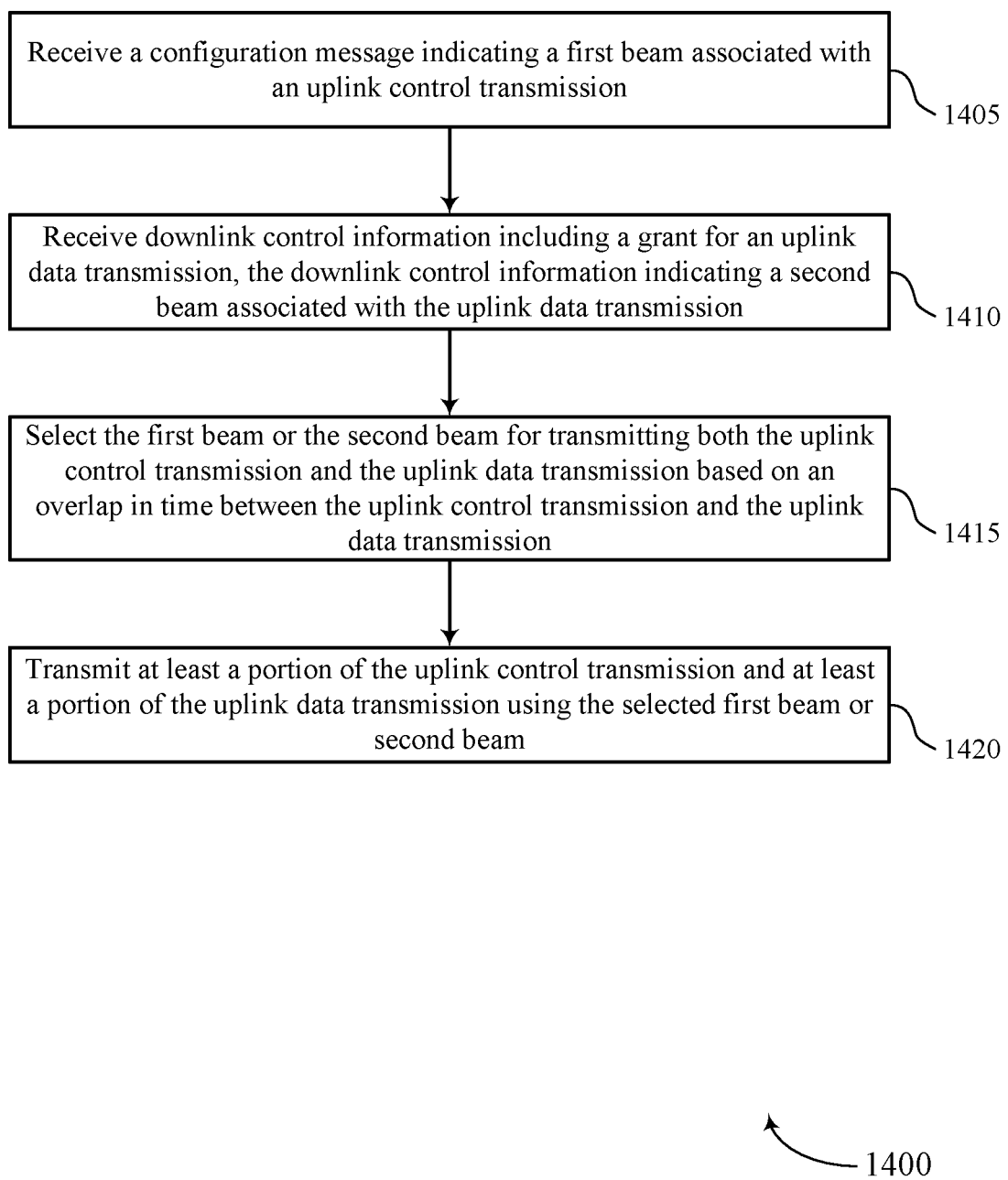
FIGS. 14-17 show example flowcharts illustrating methods that support QCL assumption of simultaneous PUCCH and PUSCH.

FIG. 14 shows a flowchart illustrating a method 1400 that supports QCL assumption of simultaneous PUCCH and PUSCH. The operations of method 1400 may be implemented by a UE 115 or its components as described herein. For example, the operations of method 1400 may be performed by a communications manager as described with reference to FIGS. 6-9. In some examples, a UE may execute a set of instructions to control the functional elements of the UE to perform the functions described below. Additionally, or alternatively, a UE may perform aspects of the functions described below using special-purpose hardware.

At 1405, the UE may receive a configuration message indicating a first beam associated with an uplink control transmission. The operations of 1405 may be performed according to the methods described herein. In some examples, aspects of the operations of 1405 may be performed by a configuration component as described with reference to FIGS. 6-9.

At 1410, the UE may receive DCI including a grant for an uplink data transmission, the DCI indicating a second beam associated with the uplink data transmission. The operations of 1410 may be performed according to the methods described herein. In some examples, aspects of the operations of 1410 may be performed by a control component as described with reference to FIGS. 6-9.

At 1415, the UE may select the first beam or the second beam for transmitting both the uplink control transmission and the uplink data transmission based on an overlap in time between the uplink control transmission and the uplink data transmission. In some aspects, the UE may select the first beam or the second beam for transmitting both the uplink control transmission and the uplink data transmission based on a first priority associated with the first beam and a second priority associated with the second beam. The operations of 1415 may be performed according to the methods described herein. In some examples, aspects of the operations of 1415 may be performed by a selection component as described with reference to FIGS. 6-9.

At 1420, the UE may transmit at least a portion of the uplink control transmission and at least a portion of the uplink data transmission using the selected first beam or second beam. The operations of 1420 may be performed according to the methods described herein. In some examples, aspects of the operations of 1420 may be performed by a beam component as described with reference to FIGS. 6-9.

Figure 15:
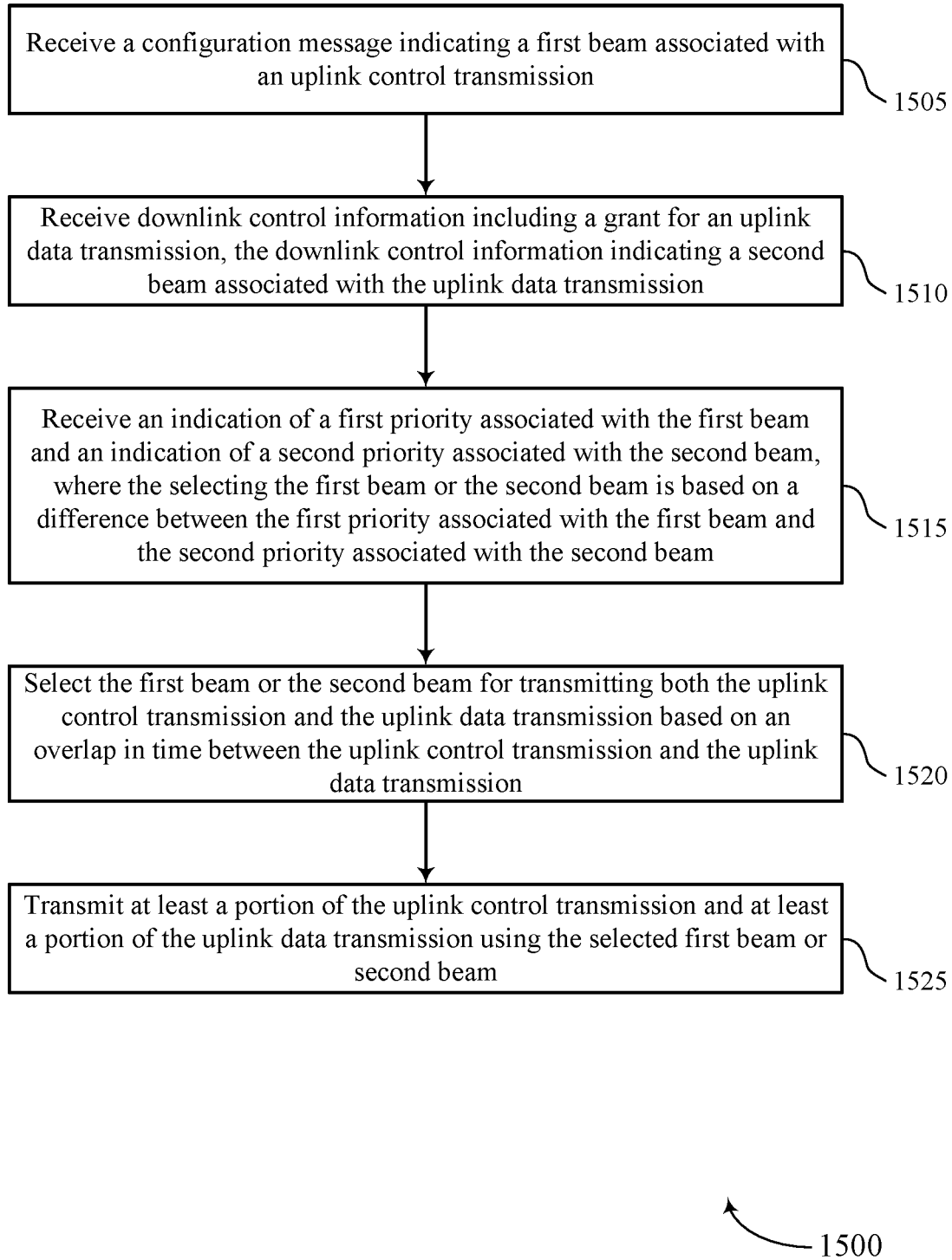

FIG. 15 shows a flowchart illustrating a method 1500 that supports QCL assumption of simultaneous PUCCH and PUSCH. The operations of method 1500 may be implemented by a UE 115 or its components as described herein. For example, the operations of method 1500 may be performed by a communications manager as described with reference to FIGS. 6-9. In some examples, a UE may execute a set of instructions to control the functional elements of the UE to perform the functions described below. Additionally, or alternatively, a UE may perform aspects of the functions described below using special-purpose hardware.

At 1505, the UE may receive a configuration message indicating a first beam associated with an uplink control transmission. The operations of 1505 may be performed according to the methods described herein. In some examples, aspects of the operations of 1505 may be performed by a configuration component as described with reference to FIGS. 6-9.

At 1510, the UE may receive DCI including a grant for an uplink data transmission, the DCI indicating a second beam associated with the uplink data transmission. The operations of 1510 may be performed according to the methods described herein. In some examples, aspects of the operations of 1510 may be performed by a control component as described with reference to FIGS. 6-9.

At 1515, the UE may receive an indication of a first priority associated with the first beam and an indication of a second priority associated with the second beam, where the selecting the first beam or the second beam is based on a difference between the first priority associated with the first beam and the second priority associated with the second beam. The operations of 1515 may be performed according to the methods described herein. In some examples, aspects of the operations of 1515 may be performed by a beam component as described with reference to FIGS. 6-9.

At 1520, the UE may select the first beam or the second beam for transmitting both the uplink control transmission and the uplink data transmission based on an overlap in time between the uplink control transmission and the uplink data transmission. In some aspects, the UE may select the first beam or the second beam for transmitting both the uplink control transmission and the uplink data transmission is based on the first priority associated with the first beam and the second priority associated with the second beam. The operations of 1520 may be performed according to the methods described herein. In some examples, aspects of the operations of 1520 may be performed by a selection component as described with reference to FIGS. 6-9.

At 1525, the UE may transmit at least a portion of the uplink control transmission and at least a portion of the uplink data transmission using the selected first beam or second beam. The operations of 1525 may be performed according to the methods described herein. In some examples, aspects of the operations of 1525 may be performed by a beam component as described with reference to FIGS. 6-9.

Figure 16:
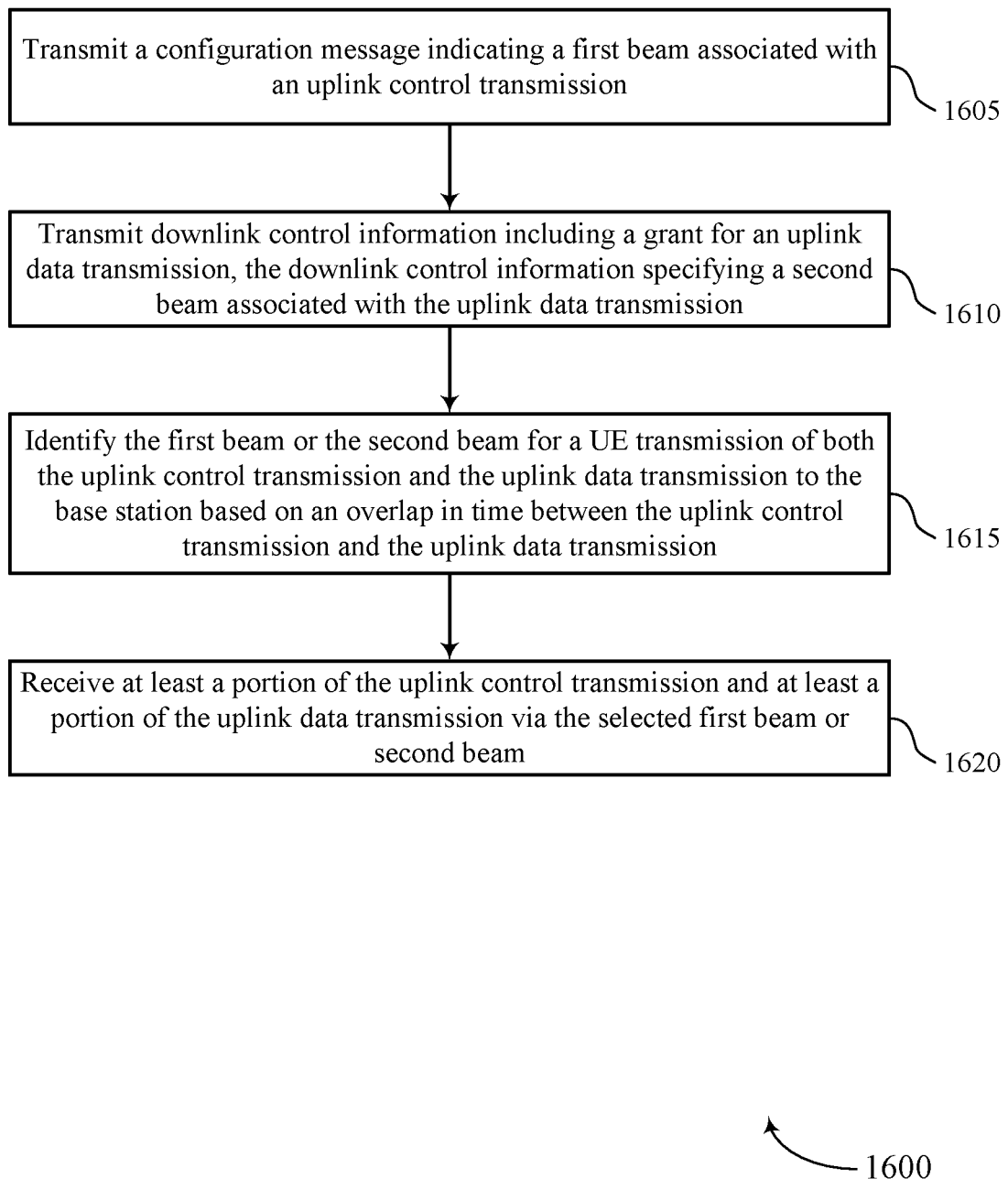

FIG. 16 shows a flowchart illustrating a method 1600 that supports QCL assumption of simultaneous PUCCH and PUSCH. The operations of method 1600 may be implemented by a base station 105 or its components as described herein. For example, the operations of method 1600 may be performed by a communications manager as described with reference to FIGS. 10-13. In some examples, a base station may execute a set of instructions to control the functional elements of the base station to perform the functions described below. Additionally, or alternatively, a base station may perform aspects of the functions described below using special-purpose hardware.

At 1605, the base station may transmit a configuration message indicating a first beam associated with an uplink control transmission. The operations of 1605 may be performed according to the methods described herein. In some examples, aspects of the operations of 1605 may be performed by a configuration component as described with reference to FIGS. 10-13.

At 1610, the base station may transmit DCI including a grant for an uplink data transmission, the DCI specifying a second beam associated with the uplink data transmission. The operations of 1610 may be performed according to the methods described herein. In some examples, aspects of the operations of 1610 may be performed by a control component as described with reference to FIGS. 10-13.

At 1615, the base station may identify the first beam or the second beam for a UE transmission of both the uplink control transmission and the uplink data transmission to the base station based on an overlap in time between the uplink control transmission and the uplink data transmission. In some aspects, the base station may identify the first beam or the second beam for the UE transmission of both the uplink control transmission and the uplink data transmission to the base station is based on a first priority associated with the first beam and a second priority associated with the second beam. The operations of 1615 may be performed according to the methods described herein. In some examples, aspects of the operations of 1615 may be performed by an identifying component as described with reference to FIGS. 10-13.

At 1620, the base station may receive at least a portion of the uplink control transmission and at least a portion of the uplink data transmission via the selected first beam or second beam. The operations of 1620 may be performed according to the methods described herein. In some examples, aspects of the operations of 1620 may be performed by a beam component as described with reference to FIGS. 10-13.

Figure 17:
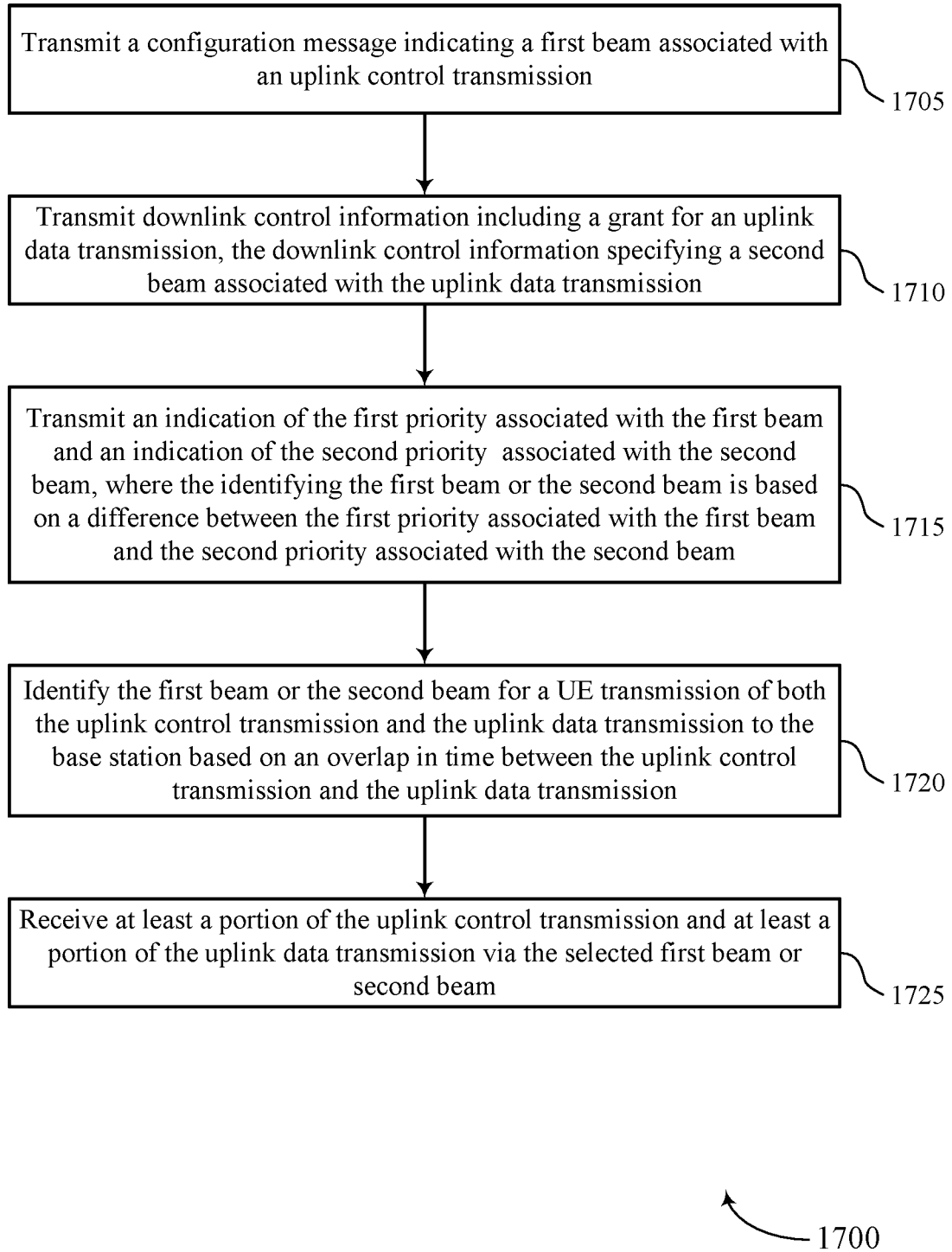

FIG. 17 shows a flowchart illustrating a method 1700 that supports QCL assumption of simultaneous PUCCH and PUSCH. The operations of method 1700 may be implemented by a base station 105 or its components as described herein. For example, the operations of method 1700 may be performed by a communications manager as described with reference to FIGS. 10-13. In some examples, a base station may execute a set of instructions to control the functional elements of the base station to perform the functions described below. Additionally, or alternatively, a base station may perform aspects of the functions described below using special-purpose hardware.

At 1705, the base station may transmit a configuration message indicating a first beam associated with an uplink control transmission. The operations of 1705 may be performed according to the methods described herein. In some examples, aspects of the operations of 1705 may be performed by a configuration component as described with reference to FIGS. 10-13.

At 1710, the base station may transmit DCI including a grant for an uplink data transmission, the DCI specifying a second beam associated with the uplink data transmission. The operations of 1710 may be performed according to the methods described herein. In some examples, aspects of the operations of 1710 may be performed by a control component as described with reference to FIGS. 10-13.

At 1715, the base station may transmit an indication of a first priority associated with the first beam and an indication of a second priority associated with the second beam, where the identifying the first beam or the second beam is based on a difference between the first priority associated with the first beam and the second priority associated with the second beam. The operations of 1715 may be performed according to the methods described herein. In some examples, aspects of the operations of 1715 may be performed by a beam component as described with reference to FIGS. 10-13.

At 1720, the base station may identify the first beam or the second beam for a UE transmission of both the uplink control transmission and the uplink data transmission to base station based on an overlap in time between the uplink control transmission and the uplink data transmission. In some aspects, the base station may identify the first beam or the second beam for the UE transmission of both the uplink control transmission and the uplink data transmission to the base station is based on the first priority associated with the first beam and the second priority associated with the second beam. The operations of 1720 may be performed according to the methods described herein. In some examples, aspects of the operations of 1720 may be performed by an identifying component as described with reference to FIGS. 10-13.

At 1725, the base station may receive at least a portion of the uplink control transmission and at least a portion of the uplink data transmission via the selected first beam or second beam. The operations of 1725 may be performed according to the methods described herein. In some examples, aspects of the operations of 1725 may be performed by a beam component as described with reference to FIGS. 10-13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an FPGA or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:
1. A method for wireless communication at an apparatus of a user equipment (UE), comprising:
receiving a configuration message indicating a first beam associated with an uplink control transmission;

receiving downlink control information (DCI) comprising a grant for an uplink data transmission, the DCI indicating a second beam associated with the uplink data transmission;
receiving an indication of a first priority associated with the first beam and an indication of a second priority associated with the second beam;
selecting the first beam or the second beam for transmitting both the uplink control transmission and the uplink data transmission based at least in part on;
an overlap in time between the uplink control transmission and the uplink data transmission, and
a difference between the first priority associated with the first beam and the second priority associated with the second beam; and
transmitting at least a portion of the uplink control transmission and at least a portion of the uplink data transmission using the selected first beam or second beam.

2. The method of claim 1, further comprising:
determining that the first priority associated with the first beam is greater than the second priority associated with the second beam based at least in part on an association between the first beam and the uplink control transmission;
wherein the selecting comprises selecting the first beam for transmitting both the uplink control transmission and the uplink data transmission based at least in part on the determining, and
wherein the transmitting comprises transmitting at least the portion of the uplink control transmission and at least the portion of the uplink data transmission using the selected first beam.

3. The method of claim 1, further comprising:
determining that the first priority associated with the first beam is greater than the second priority associated with the second beam based at least in part on an association between the first beam and the uplink control transmission;
wherein the selecting comprises selecting the second beam for transmitting both the uplink control transmission and the uplink data transmission based at least in part on the determining, and
wherein the transmitting comprises transmitting at least the portion of the uplink control transmission and at least the portion of the uplink data transmission using the selected second beam.

4. The method of claim 1, wherein the transmitting comprises:
transmitting at least the portion of the uplink control transmission and at least the portion of the uplink data transmission over a single antenna panel of the UE.

5. A method for wireless communication at an apparatus of a base station, comprising:
transmitting a configuration message indicating a first beam associated with an uplink control transmission;
transmitting downlink control information (DCI) comprising a grant for an uplink data transmission, the DCI specifying a second beam associated with the uplink data transmission;
transmitting an indication of a first priority associated with the first beam and an indication of a second priority associated with the second beam;
identifying the first beam or the second beam for a UE transmission of both the uplink control transmission and the uplink data transmission to the base station based at least in part on:
an overlap in time between the uplink control transmission and the uplink data transmission, and
a difference between the first priority associated with the first beam and the second priority associated with the second beam; and
receiving at least a portion of the uplink control transmission and at least a portion of the uplink data transmission via the identified first beam or second beam.

6. The method of claim 5, further comprising:
determining that the first priority associated with the first beam is greater than the second priority associated with the second beam based at least in part on an association between the first beam and the uplink control transmission;
wherein the identifying comprises identifying the first beam for the UE transmission of both the uplink control transmission and the uplink data transmission based at least in part on the determining, and
wherein the receiving comprises receiving at least the portion of the uplink control transmission and at least the portion of the uplink data transmission via the identified first beam.

7. The method of claim 5, further comprising:
determining that the first priority associated with the first beam is greater than the second priority associated with the second beam based at least in part on an association between the first beam and the uplink control transmission;
wherein the identifying comprises identifying the second beam for the UE transmission of both the uplink control transmission and the uplink data transmission based at least in part on the determining, and
wherein the receiving comprises receiving at least the portion of the uplink control transmission and at least the portion of the uplink data transmission via the identified second beam.

8. The method of claim 5, wherein the receiving comprises:
receiving at least the portion of the uplink control transmission and at least the portion of the uplink data transmission over a single antenna panel of the base station.

9. An apparatus for wireless communication at an apparatus of a user equipment (UE), comprising:
a first interface configured to:
obtain a configuration message indicating a first beam associated with an uplink control transmission;
obtain downlink control information (DCI) including a grant for an uplink data transmission, the DCI indicating a second beam associated with the uplink data transmission; and
obtain an indication of a first priority associated with the first beam and an indication of a second priority associated with the second beam; and
a processing system configured to:
select the first beam or the second beam for transmitting both the uplink control transmission and the uplink data transmission based at least in part on:
an overlap in time between the uplink control transmission and the uplink data transmission, and
a difference between the first priority associated with the first beam and the second priority associated with the second beam; and
a second interface configured to:

output at least a portion of the uplink control transmission and at least a portion of the uplink data transmission for transmission using the selected first beam or second beam.

10. The apparatus of claim 9, wherein the processing system is further configured to:
determine that the first priority associated with the first beam is greater than the second priority associated with the second beam based at least in part on an association between the first beam and the uplink control transmission;
wherein the selecting includes selecting the first beam for transmitting both the uplink control transmission and the uplink data transmission based at least in part on the determining, and
wherein the outputting comprises outputting at least the portion of the uplink control transmission and at least the portion of the uplink data transmission for transmission using the selected first beam.

11. The apparatus of claim 9, wherein the processing system is further configured to:
determine that the first priority associated with the first beam is greater than the second priority associated with the second beam based at least in part on an association between the first beam and the uplink control transmission;
wherein the selecting includes selecting the second beam for transmitting both the uplink control transmission and the uplink data transmission based at least in part on the determining, and
wherein the outputting comprises outputting at least the portion of the uplink control transmission and at least the portion of the uplink data transmission for transmission using the selected second beam.

12. The apparatus of claim 9, wherein the first priority associated with the first beam and the second priority associated with the second beam comprise physical layer priorities.

13. The apparatus of claim 9, wherein the outputting comprises:
outputting at least the portion of the uplink control transmission and at least the portion of the uplink data transmission for transmission over a single antenna panel of the UE.

14. The apparatus of claim 9, wherein the uplink control transmission comprises a physical uplink control channel (PUCCH) transmission.

15. The apparatus of claim 9, wherein the uplink data transmission comprises a physical uplink shared channel (PUSCH) transmission.

16. An apparatus for wireless communication at an apparatus of a base station, comprising:
a first interface configured to:
output a configuration message indicating a first beam associated with an uplink control transmission;
output downlink control information (DCI) comprising a grant for an uplink data transmission, the DCI specifying a second beam associated with the uplink data transmission; and
output an indication of a first priority associated with the first beam and an indication of a second priority associated with the second beam; and
a processing system configured to:
identify the first beam or the second beam for a UE transmission of both the uplink control transmission and the uplink data transmission to the base station based at least in part on:
an overlap in time between the uplink control transmission and the uplink data transmission, and
a difference between the first priority associated with the first beam and the second priority associated with the second beam; and
a second interface configured to:
obtain at least a portion of the uplink control transmission and at least a portion of the uplink data transmission via the identified first beam or second beam.

17. The apparatus of claim 16, wherein the processing system is further configured to:
determine that the first priority associated with the first beam is greater than the second priority associated with the second beam based at least in part on an association between the first beam and the uplink control transmission;
wherein the identifying comprises identifying the first beam for the UE transmission of both the uplink control transmission and the uplink data transmission based at least in part on the determining, and
wherein the obtaining comprises obtaining at least the portion of the uplink control transmission and at least the portion of the uplink data transmission via the identified first beam.

18. The apparatus of claim 16, wherein the processing system is further configured to:
determine that the first priority associated with the first beam is greater than the second priority associated with the second beam based at least in part on an association between the first beam and the uplink control transmission;
wherein the identifying comprises identifying the second beam for the UE transmission of both the uplink control transmission and the uplink data transmission based at least in part on the determining, and
wherein the obtaining comprises obtaining at least the portion of the uplink control transmission and at least the portion of the uplink data transmission via the identified second beam.

19. The apparatus of claim 16, wherein the first priority associated with the first beam and the second priority associated with the second beam comprise physical layer priorities.

20. The apparatus of claim 16, wherein the obtaining comprises:
obtaining at least the portion of the uplink control transmission and at least the portion of the uplink data transmission over a single antenna panel of the base station.

21. The apparatus of claim 16, wherein the uplink control transmission comprises a physical uplink control channel (PUCCH) transmission.

22. The apparatus of claim 16, wherein the uplink data transmission comprises a physical uplink shared channel (PUSCH) transmission.

* * * * *